United States Patent [19]

Ramakrishnan et al.

[11] Patent Number: 5,390,318
[45] Date of Patent: Feb. 14, 1995

[54] MANAGING THE FETCHING AND REPLACEMENT OF CACHE ENTRIES ASSOCIATED WITH A FILE SYSTEM

[75] Inventors: Kadangode K. Ramakrishnan, Maynard, Mass.; Prabuddha Biswas, Nashua, N.H.

[73] Assignee: Digital Equipment Corporation, Maynard, Mass.

[21] Appl. No.: 243,041

[22] Filed: May 16, 1994

Related U.S. Application Data

[63] Continuation of Ser. No. 545,879, Jun. 29, 1990, abandoned.

[51] Int. Cl.$^6$ ............................................. G06F 12/02
[52] U.S. Cl. ............................. 395/425; 364/DIG. 1; 364/243.45; 364/246.12; 364/246.13; 364/251.5; 364/251.6; 364/254.2
[58] Field of Search ............................... 395/600, 425; 364/200 MS File, 900 MS File

[56] References Cited

U.S. PATENT DOCUMENTS

| | | | |
|---|---|---|---|
| 3,898,624 | 8/1975 | Tobias | 395/250 |
| 4,489,378 | 12/1984 | Dixon et al. | 395/425 |
| 4,928,239 | 5/1990 | Baum et al. | 395/425 |
| 5,008,820 | 4/1991 | Christopher, Jr. et al. | 395/600 |
| 5,043,885 | 8/1991 | Robison | 395/425 |
| 5,093,779 | 3/1992 | Sakurai | 395/600 |
| 5,133,060 | 7/1992 | Weber et al. | 395/425 |
| 5,134,563 | 7/1992 | Tayler et al. | 395/250 |
| 5,146,578 | 9/1992 | Zangenehpour | 395/425 |
| 5,151,989 | 9/1992 | Johnson et al. | 395/600 |

FOREIGN PATENT DOCUMENTS

| | | |
|---|---|---|
| 0278472 | 2/1987 | European Pat. Off. . |
| 0284664 | 10/1988 | European Pat. Off. . |
| 0352447 | 1/1990 | European Pat. Off. . |

OTHER PUBLICATIONS

Ramikrishnan, K . K., et al., "Performance Analysis of Mass Storage Service Alternatives For Distributed Systems", DEC Technical Report 449, Aug. 21, 1986.
IEEE Proceedings on the 6th International Conference On Distributed Computing Systems, Cambridge, 19 May 1986 IEEE, New York Sheltzer et al."Name Service Locality and Cache Design In A Distributed Operating System".
IEEE Transactions On Software Engineering, vol. SE-12, No. 11, Nov. 1986, IEEE, New York, Sheltzer et al, "Internet Locus: Extending Transparency to an Internet Environment".
IEEE Transactions of Knowledge and Data Engineering, vol. 1, No. 2, Jun., 1989, IEEE, New York, Floyd et al. "Directory Reference Patterns in Hierachial File Systems".
Proceedings of the 10th International Conference On Distributed Computing systems, Paris 28 May 1990 IEEE, Washington, D.C., Korner, "Intelligent Caching For Remote File Service".
Patent Abstracts of Japan, vol. 01, No. 4044 (P-0996) 26 Jan. 1990 & JP-A-12 74 257 (Fujitsu) "abstract".

Primary Examiner—Joseph L. Dixon
Assistant Examiner—Hiep T. Nguyen
Attorney, Agent, or Firm—Fish & Richardson

[57] ABSTRACT

Information needed by application programs from a secondary storage is cached in a cache memory which is organized in multiple levels, each level having multiple entries, the entries of each level receiving information of a predetermined category, each entry being accessible independently. Links are defined between entries of one level of the cache memory and entries at another level of the cache memory, the links corresponding to information relationships specified by a user of information stored in the secondary storage. In response to a request to a file system from an application for needed information, the needed information is fetched into the cache, and in connection with fetching the needed information, other information is prefetched from the system of files which is not immediately needed. Quotas are established on information which may be fetched from a secondary storage into the cache, the quotas being applicable to file contents within a file and to the number of files within a directory. Upon a request from an application program to open a file, an entry is created in a cache corresponding to the file, the entry including file header information. The file header information is retained in the cache so long as the file remains open, whether or not any file contents of the file remain in cache. The entries of three level of the cache respectively receive directory information, file header information, and file contents information.

62 Claims, 25 Drawing Sheets

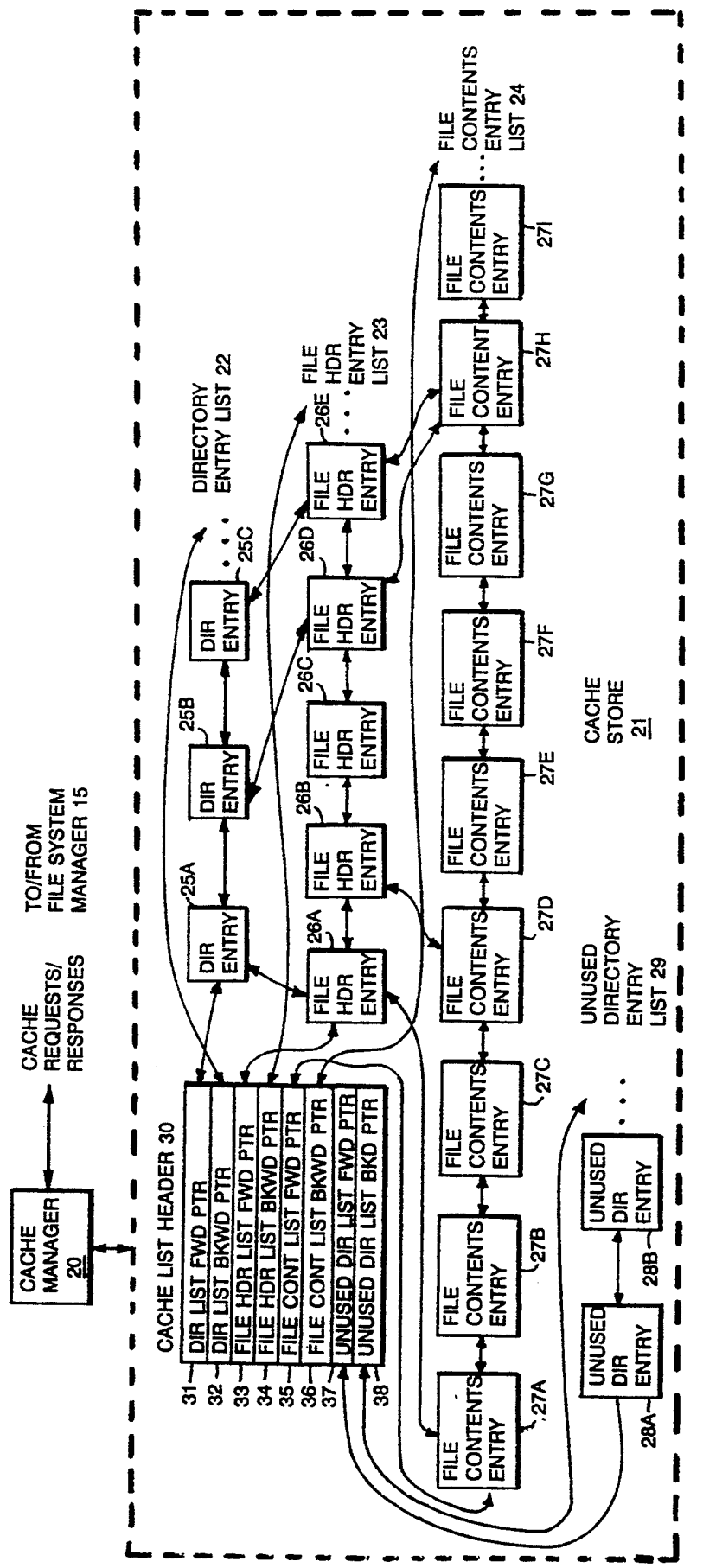

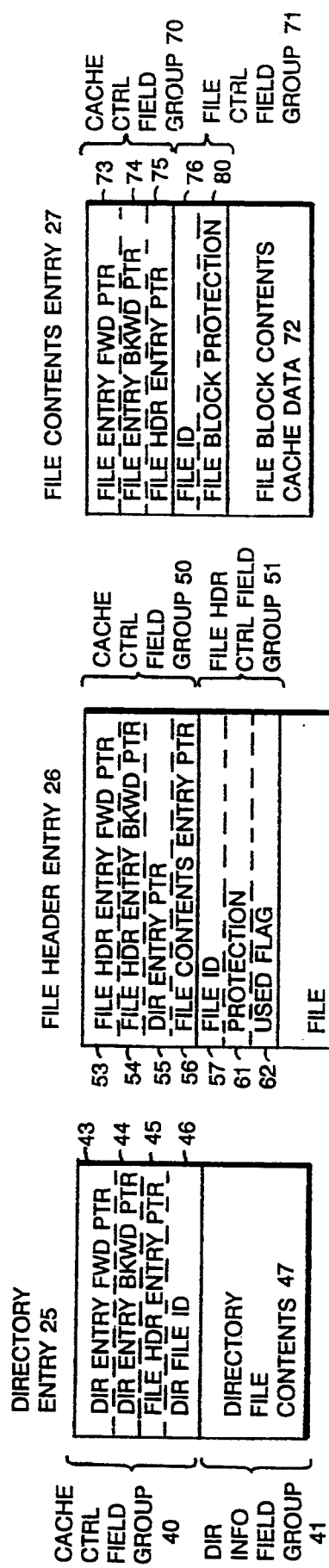

FIG. 4-1

114 FILE SYSTEM MANAGER GENERATES CACHE REQUEST FOR CACHE MANAGER REQUESTING FILE HEADER OF REQUIRED PROCESSOR FILE

115 CACHE MANAGER DETERMINES WHETHER SPECIFIED FILE HEADER IS CACHED IN A FILE HEADER ENTRY — NO → 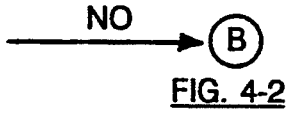
FIG. 4-2

YES

116 CACHE MANAGER PERFORMS CACHE OPERATIONS INCLUDING TRANSFER OF CONTENTS OF FILE HEADER ENTRY'S FILE HEADER CACHE DATA FIELD TO FILE SYSTEM MANAGER

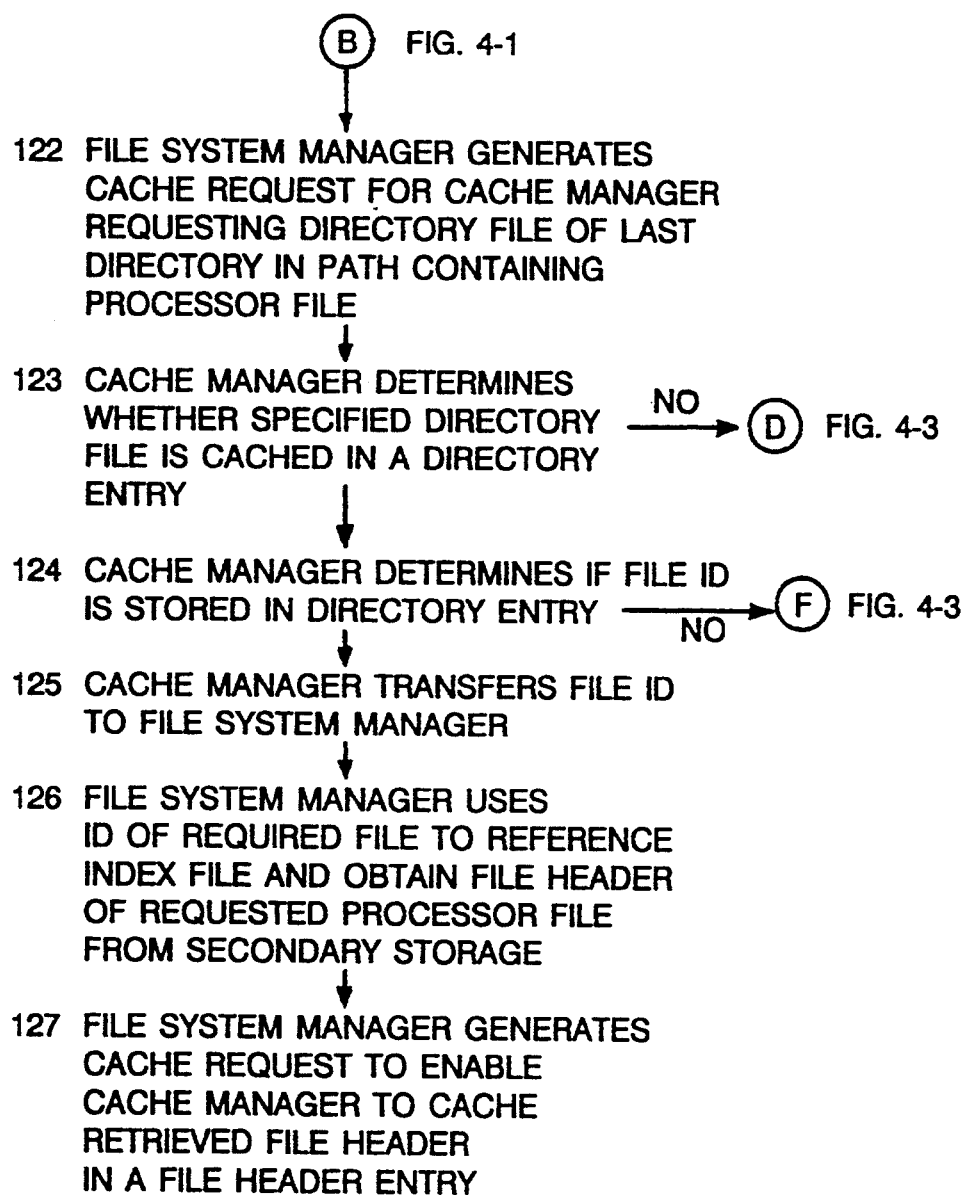

128 FILE SYSTEM MANAGER DETERMINES WHETHER DIRECTORY FILE'S HEADER IS STORED IN CACHE — YES

↓ NO

129 USE DIRECTORY FILE ID TO READ DIRECTORY FILE'S HEADER FROM SECONDARY STORAGE AND CACHE DIRECTORY FILE HEADER UNDER DIRECTORY ENTRY

130 FILE SYSTEM MANAGER USES RETRIEVED DIRECTORY FILE TO RETRIEVE REQUIRED BLOCK OF DIRECTORY FILE FROM SECONDARY STORAGE, CACHE BLOCK, AND OBTAIN FILE ID

131 FILE SYSTEM MANAGER GENERATES CACHE REQUEST FOR CACHE MANAGER REQUESTING DIRECTORY FILE OF PRECEDING DIRECTORY IN PATH CONTAINING PROCESSOR FILE

132 CACHE MANAGER DETERMINES WHETHER SPECIFIED DIRECTORY FILE IS CACHED IN A DIRECTORY ENTRY — NO

↓ YES

133 CACHE MANAGER DETERMINES IF FILE ID OF REQUIRED DIRECTORY IS STORED IN DIRECTORY ENTRY → (F) FIG. 4-4

134 CACHE MANAGER TRANSFERS FILE ID TO FILE SYSTEM MANAGER (E) FIG. 4-4

NO  135 FILE SYSTEM MANAGER DETERMINES WHETHER PRECEDING DIRECTORY IS ROOT DIRECTORY

↓ YES

136 FILE SYSTEM MANAGER OBTAINS DIRECTORY FILE OF ROOT DIRECTORY FILE FROM CACHE AND TRANSFERS FILE ID TO FILE SYSTEM MANAGER (E) FIG. 4-4

FIG. 4-5

141 FILE SYSTEM MANAGER RECEIVES ACCESS REQUEST FROM APPLICATION

142 FILE SYSTEM MANAGER GENERATES CACHE REQUEST FOR CACHE MANAGER REQUESTING SPECIFIED BLOCK OF PROCESSOR FILE

143 CACHE MANAGER DETERMINES WHETHER SPECIFIED BLOCK OF PROCESSOR FILE IS CACHED IN A FILE CONTENTS ENTRY — NO

YES

144 CACHE MANAGER PERFORMS CACHE OPERATIONS INCLUDING TRANSFER OF FILE CONTENTS ENTRY'S FILE BLOCK CONTENTS CACHE DATA FIELD TO FILE SYSTEM MANAGER

145 IF NO FILE HEADER ENTRY FOR FILE IS CACHED, FILE SYSTEM MANAGER OBTAINS FILE HEADER OF SPECIFIED PROCESSOR FILE AND CACHES IT

146 FILE SYSTEM MANAGER USES SPECIFIED FILE BLOCK IDENTIFIER TO LOCATE REQUIRED PORTION OF PROCESSOR FILE IN SECONDARY STORAGE

147 FILE SYSTEM MANAGER MAKES FILE BLOCK AVAILABLE TO APPLICATION

148 FILE SYSTEM MANAGER GENERATES CACHE REQUEST TO ENABLE CACHE MANAGER TO CACHE FILE BLOCK BELOW NEW FILE HEADER ENTRY

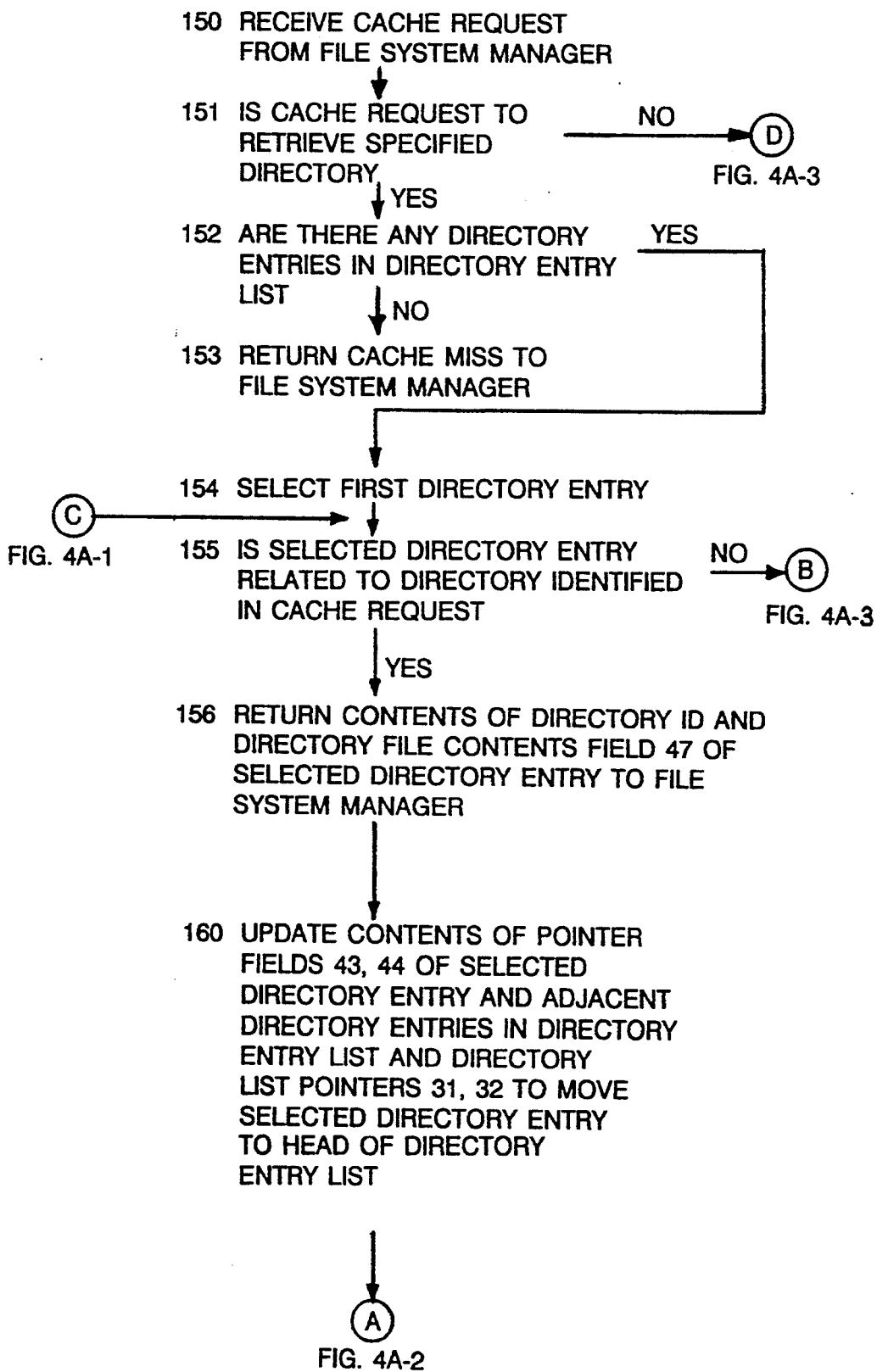

FIG. 4A-2

161 UPDATE CONTENTS OF POINTER FIELDS 53,54 OF FILE HDR ENTRIES IN SEQUENCE IN FILE HDR ENTRY LIST IDENTIFIED BY FILE HDR ENTRY PTR IN SELECTED DIRECTORY ENTRY AND FILE HDR LIST PTRS 33,34 TO MOVE FILE HDRS ASSOCIATED WITH SELECTED DIRECTORY ENTRY TO HEAD OF FILE HDR ENTRY LIST

162 UPDATE CONTENTS OF POINTER FIELDS 73,74 OF FILE CONTENTS ENTRIES POINTED TO BY FILE HDR ENTRY SEQUENCE IDENTIFIED BY FILE HDR ENTRY PTR IN SELECTED DIRECTORY ENTRY AND FILE CONTENTS ENTRY LIST PTRS 35,36. MOVE FILE CONTENTS ENTRIES ASSOCIATED WITH SELECTED DIRECTORY ENTRY TO HEAD OF FILE CONTENTS ENTRY LIST

 FIG. 4A-1

164 DOES DIRECTORY ENTRY LIST CONTAIN ANY ADDITIONAL ENTRIES ? —YES

NO

165 RETURN CACHE MISS TO FILE SYSTEM MANAGER

166 SELECT NEXT DIRECTORY ENTRY IN DIRECTORY ENTRY LIST

 FIG. 4A-1

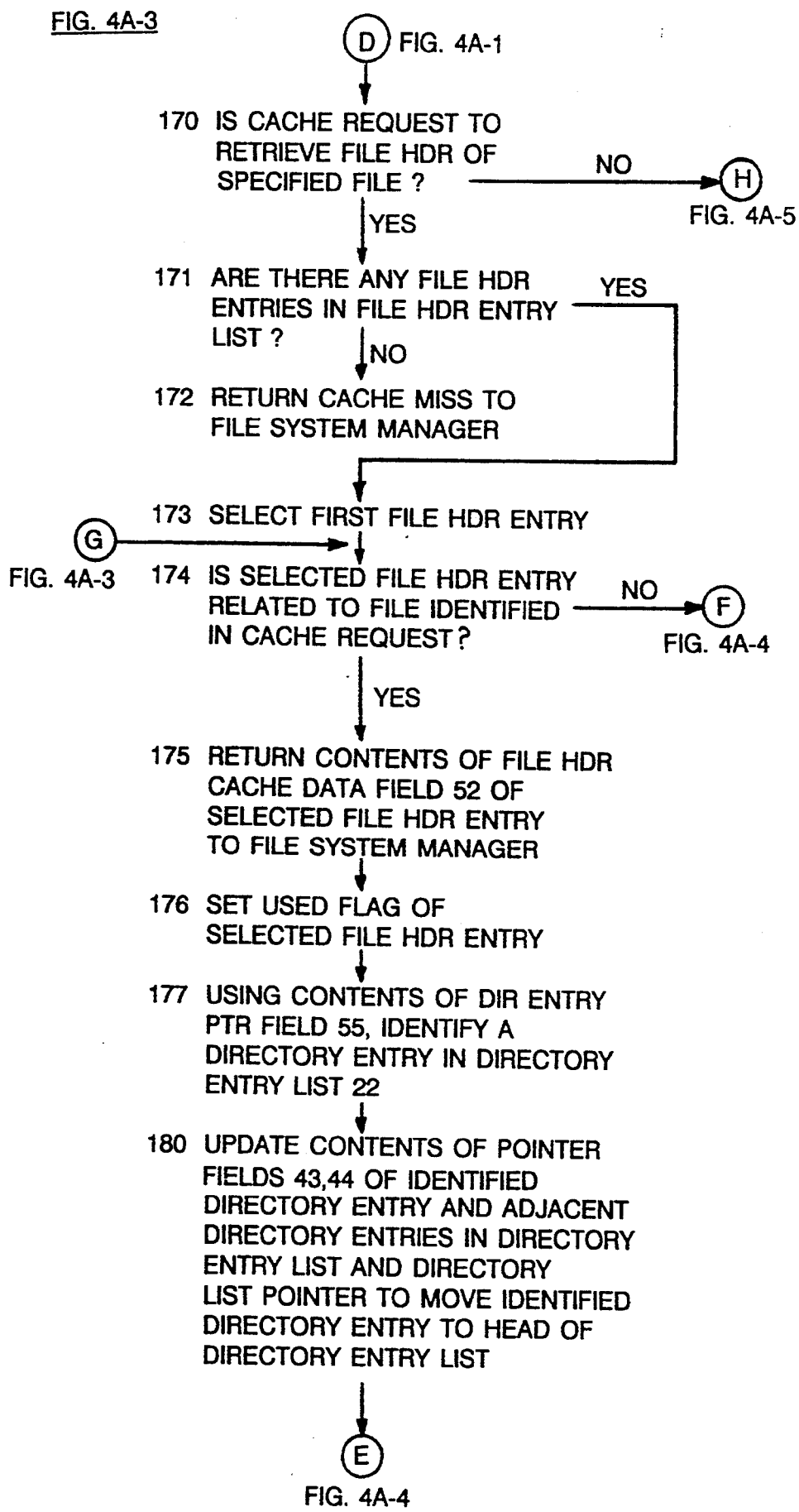

FIG. 4A-4

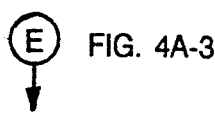 FIG. 4A-3

181 UPDATE CONTENTS OF POINTER FIELDS 53, 54 OF FILE HDR ENTRIES IN SEQUENCE IN FILE HDR ENTRY LIST IDENTIFIED BY FILE HDR ENTRY PTR IN IDENTIFIED DIRECTORY ENTRY AND FILE HDR LIST PTRS 33, 34 TO MOVE FILE HDRS ASSOCIATED WITH IDENTIFIED DIRECTORY ENTRY TO HEAD OF FILE HDR ENTRY LIST

182 UPDATE CONTENTS OF POINTER FIELD 73, 74 OF FILE CONTENTS ENTRIES POINTED TO BY FILE HDR ENTRY SEQUENCE IDENTIFIED BY FILE HDR ENTRY PTR IN IDENTIFIED DIRECTORY ENTRY AND FILE CONTENTS ENTRY LIST PTRS 35, 36 TO MOVE FILE CONTENTS ENTRIES ASSOCIATED WITH SELECTED FILE HDR ENTRY TO HEAD OF FILE CONTENTS ENTRY LIST

183 MOVE SELECTED FILE HEADER ENTRY TO HEAD OF FILE HEADER ENTRY LIST. MOVE FILE CONTENTS ENTRIES POINTED TO BY SELECTED FILE HDR ENTRY TO HEAD OF FILE CONTENTS ENTRY LIST

DONE

 FIG. 4A-3

184 DOES FILE HDR ENTRY LIST CONTAIN ANY ADDITIONAL ENTRIES ? —YES

NO

185 RETURN CACHE MISS TO FILE SYSTEM MANAGER

186 SELECT NEXT FILE HDR ENTRY IN FILE HDR ENTRY LIST

 FIG. 4A-3

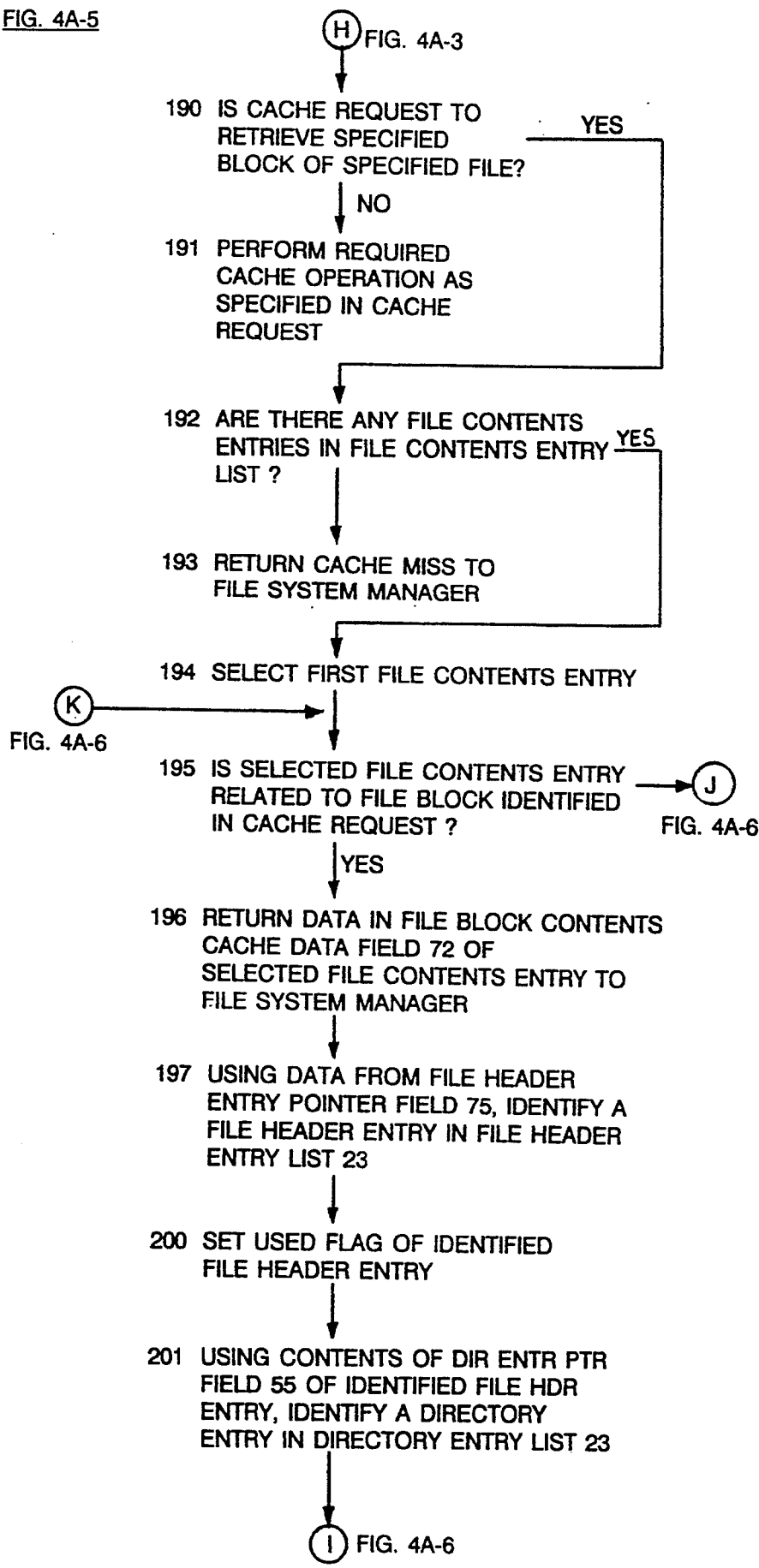

FIG. 4A-6

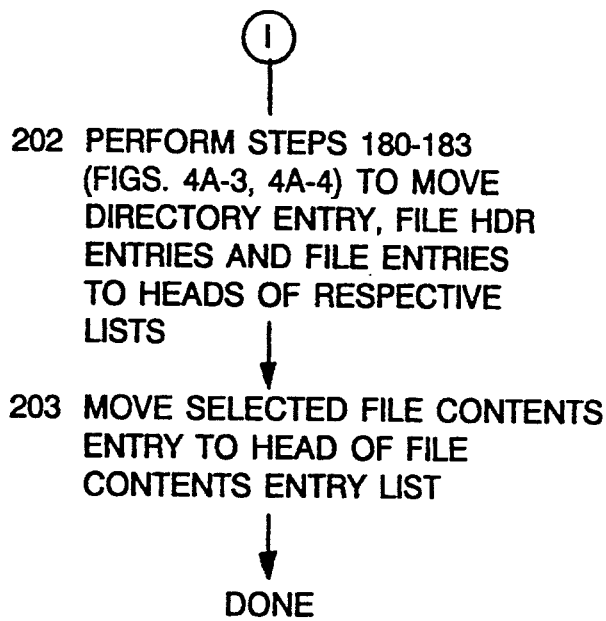

Ⓘ
↓
202 PERFORM STEPS 180-183
(FIGS. 4A-3, 4A-4) TO MOVE
DIRECTORY ENTRY, FILE HDR
ENTRIES AND FILE ENTRIES
TO HEADS OF RESPECTIVE
LISTS
↓
203 MOVE SELECTED FILE CONTENTS
ENTRY TO HEAD OF FILE
CONTENTS ENTRY LIST
↓
DONE

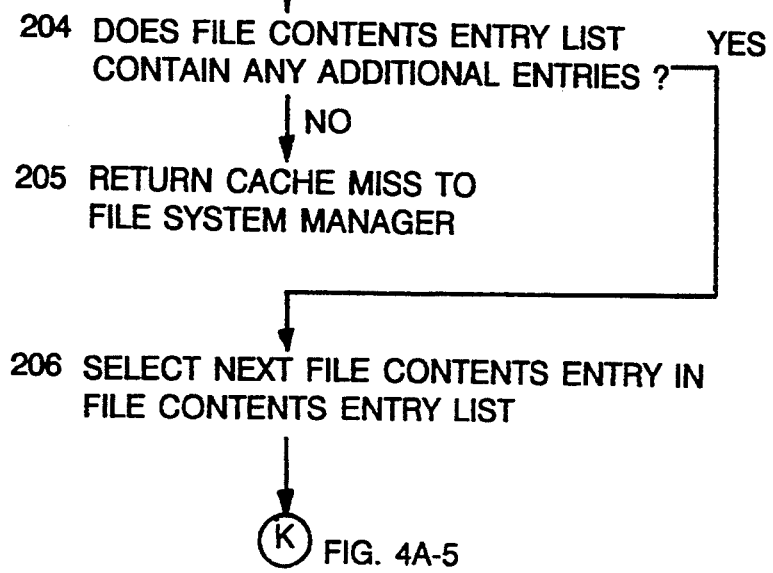

Ⓙ FIG. 4A-5
↓
204 DOES FILE CONTENTS ENTRY LIST      YES
CONTAIN ANY ADDITIONAL ENTRIES ?
↓ NO
205 RETURN CACHE MISS TO
FILE SYSTEM MANAGER
↓
206 SELECT NEXT FILE CONTENTS ENTRY IN
FILE CONTENTS ENTRY LIST
↓
Ⓚ FIG. 4A-5

FIG. 4B-2

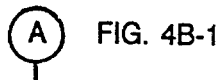 FIG. 4B-1

232 UPDATE CONTENTS OF POINTER FIELDS 43, 44 OF IDENTIFIED DIRECTORY ENTRY AND ADJACENT DIRECTORY ENTRIES IN DIRECTORY ENTRY LIST AND DIRECTORY LIST POINTERS 31, 32 TO MOVE IDENTIFIED DIRECTORY ENTRY TO HEAD OF DIRECTORY ENTRY LIST

233 COPY POINTER FROM FILE HDR ENTRY PTR OF IDENTIFIED DIRECTORY ENTRY INTO FILE HDR ENTRY FWD PTR 53 OF NEW FILE HDR ENTRY AND STORE POINTER TO NEW FILE HDR ENTRY 26 IN FILE HDR ENTRY POINTER 45 OF IDENTIFIED DIRECTORY ENTRY TO LINK NEW FILE HDR ENTRY 26 TO DIRECTORY ENTRY 25

234 UPDATE CONTENTS OF POINTER FIELDS 53, 54 OF FILE HDR ENTRIES IN SEQUENCE IN FILE HDR ENTRY LIST IDENTIFIED BY FILE HDR ENTRY FWD PTR 53 OF NEW FILE HDR ENTRY TO MOVE SEQUENCE TO HEAD OF FILE HDR ENTRY LIST FOLLOWING NEW FILE HDR ENTRY

235 UPDATE CONTENTS OF POINTER FIELDS 73, 74 OF FILE CONTENTS ENTRIES POINTED TO BY FILE HDR ENTRY SEQUENCE IDENTIFIED BY FILE HDR ENTRY PTR IN IDENTIFIED DIRECTORY ENTRY AND FILE CONTENTS ENTRY LIST PTRS TO MOVE FILE CONTENTS ENTRY LIST PTRS TO MOVE FILE CONTENTS ENTRIES ASSOCIATED WITH IDENTIFIED DIRECTORY ENTRY TO HEAD OF FILE CONTENTS ENTRY LIST

236 STORE FILE HEADER IN NEW ENTRY AND SET NEW ENTRY'S USED FLAG

DONE

FIG. 4B-3

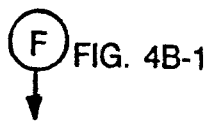 FIG. 4B-1

237 PERFORM REQUIRED CACHE OPERATION AS SPECIFIED IN CACHE REQUEST

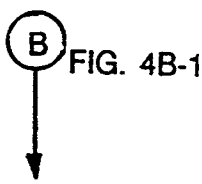 FIG. 4B-1

239 IDENTIFY FILE HDR ENTRY 26 ASSOCIATED WITH FILE TO BE ASSOCIATED WITH NEW FILE CONTENTS ENTRY 27

240 USING IDENTIFIED FILE HDR ENTRY 26, IDENTIFY ASSOCIATED DIRECTORY ENTRY 25

241 UPDATE CONTENTS OF POINTER FIELDS 43, 44 OF IDENTIFIED DIRECTORY ENTRY AND ADJACENT DIRECTORY ENTRIES IN DIRECTORY ENTRY LIST AND DIRECTORY LIST POINTER 33 TO MOVE IDENTIFIED DIRECTORY ENTRY TO HEAD OF DIRECTORY ENTRY LIST

242 UPDATE CONTENTS OF POINTER FIELDS 53, 54 OF IDENTIFIED FILE HDR ENTRIES IN SEQUENCE IN FILE HDR LIST IDENTIFIED BY FILE HDR ENTRY PTR IN IDENTIFIED DIRECTORY ENTRY TO MOVE SEQUENCE TO HEAD OF FILE HDR ENTRY LIST

 FIG. 4B-4

FIG. 4B-4

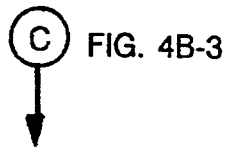 FIG. 4B-3

243 COPY FILE CONTENTS ENTRY PTR FROM
FILE HDR ENTRY 26 IDENTIFIED IN
STEP 240 INTO FILE CONTENTS ENTRY
FWD PTR 73 OF NEW FILE CONTENTS
ENTRY AND STORE POINTER TO NEW
FILE CONTENTS ENTRY 27 IN FILE
CONTENTS ENTRY PTR FIELD 56 OF
IDENTIFIED FILE HDR ENTRY 26
TO LINK NEW FILE CONTENTS ENTRY 27
TO FILE HDR ENTRY 26

244 UPDATE CONTENTS OF POINTER
FIELDS 73, 74 OF FILE CONTENTS
ENTRIES POINTED TO BY FILE HDR
ENTRY SEQUENCE IDENTIFIED BY
DIRECTORY ENTRY IDENTIFIED IN
STEP 240 AND FILE CONTENTS ENTRY LIST
PTR TO MOVE FILE CONTENTS ENTRIES
ASSOCIATED WITH IDENTIFIED DIRECTORY
ENTRY TO HEAD OF FILE CONTENTS ENTRY LIST.

245 MOVE FILE HEADER ENTRY ASSOCIATED
WITH FILE TO BE ASSOCIATED WITH
NEW FILE CONTENTS ENTRY 27 TO
HEAD OF FILE HEADER ENTRY LIST AND
SET ITS USED FLAG

246 STORE FILE BLOCK SUPPLIED WITH
REQUEST IN FILE BLOCK CONTENTS
CACHE DATA FIELD OF NEWLY
CREATED ENTRY

DONE

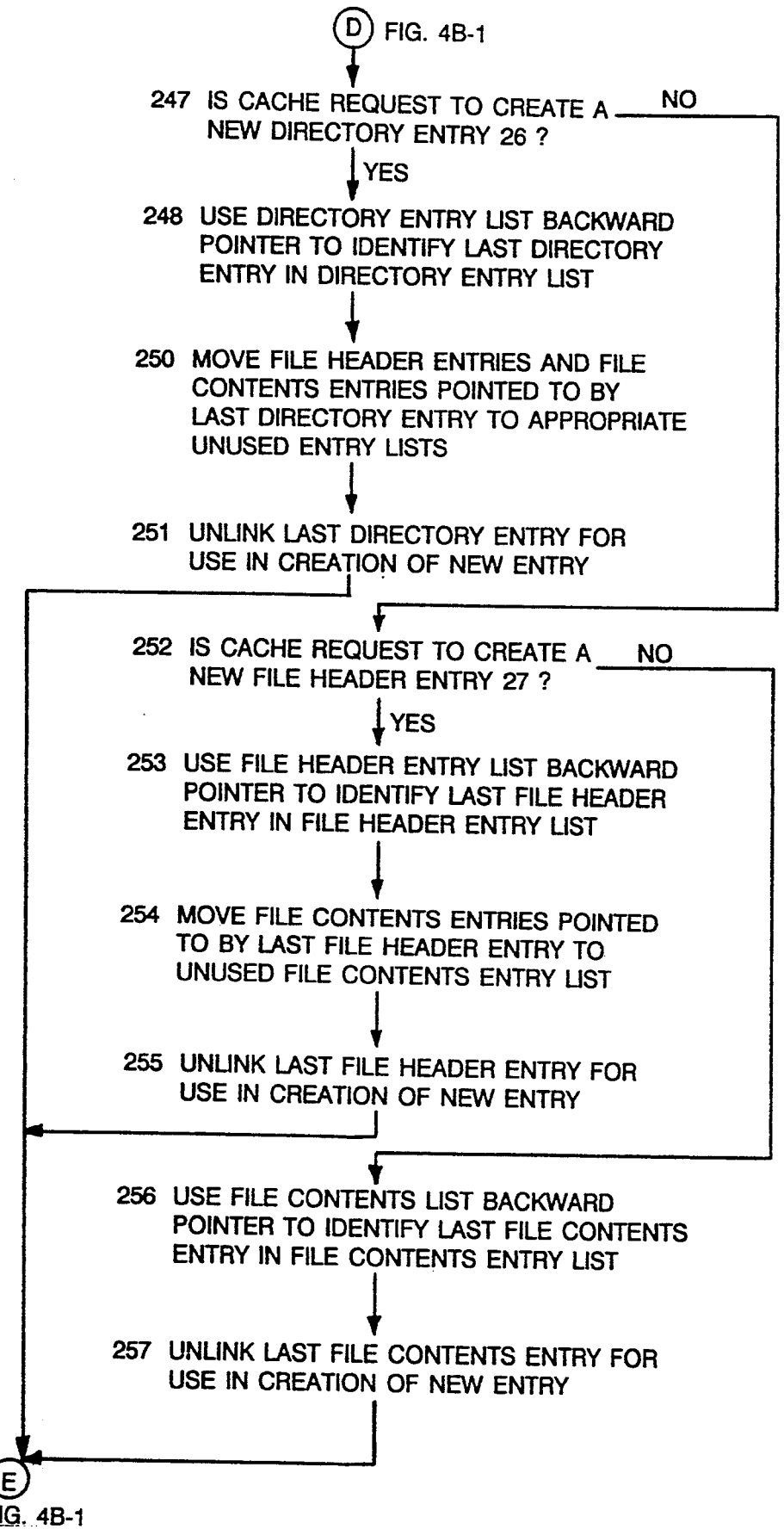

AGING OPERATION

QUOTA DETERMINATION

PREFETCH

MANAGING THE FETCHING AND REPLACEMENT OF CACHE ENTRIES ASSOCIATED WITH A FILE SYSTEM

This is a continuation of application Ser. No. 07/545,879, filed Jun. 29, 1990, now abandoned.

BACKGROUND OF THE INVENTION

The invention relates generally to the field of digital data processing systems, and more particularly to a file system for managing files containing information within a digital data processing system.

A typical computer system includes three basic elements, namely, a processor, a memory and an input/output system. The memory stores information, including data and instructions for processing the data, in a plurality of addressable storage locations. The processor enables information to be transferred, or fetched, to it, interprets the incoming information as either instructions or data, and processes the data in accordance with the instructions. The processor then transfers the processed data to addressed locations in the memory for storage.

The input/output system also communicates with the memory and the processor in order to transfer information into the computer system and to obtain the processed data from it. The input/output system typically comprises, for example, printers, video display terminals, and secondary information storage devices such as disk and tape storage units, which are responsive to control information supplied to them by the processor.

In a computer system, information is typically organized in the form of files in secondary storage, that is, stored on the secondary storage devices such as magnetic disks or tape. Each file includes a file header, or file control block, and file data. The file header may include such information as a file identifier (file ID) (e.g., a numeric name which is assigned to the file by the file system and used internally to refer to the file), a symbolic file name (e.g., a text name for the file, which is assigned to the file by the user and may therefore have some mnemonic significance), addressing information for locating the file data (which is typically arranged in fixed-size blocks) in secondary storage, and file control information identifying, for example, the date the file was created, the last revision date, the organization of data in the file, and protection information used to regulate access to or control of the file by the various operators who may use the computer system.

In what follows, when referring to requests by the processor to perform actions on the files in secondary storage, the phrase "access request" will be used when referring to requests that read from existing files, or write to new files; whereas the term "control request" will be used when referring to requests that use the file header, for example, open, close, create, delete, or modifying a file header.

Typically, the files on a secondary storage device are indexed by two special files, the beginning of which can be located at predetermined addresses on the secondary storage device. The first special file is an index file, which is a table of file headers. The second special file is a root directory file (the use of the term "root" will be clarified below), which lists the symbolic names and file IDs of the files in the root directory of the secondary storage device.

Since a computer system may maintain a large number of files, the files are organized into a hierarchically-organized directory system. In a hierarchical directory system, the highest level, or "root" directory may not only include files, but also subdirectories of files, where each subdirectory may, in turn, include references to additional files or subdirectories.

The subdirectories are defined by directory files, which are formatted and managed in the same manner as the files which store programs to run on the processor, data to be used by such programs, or other information to be used in the operation of the computer system (this latter category of files will be referred to as processor files). Thus, the root directory file not only lists the symbolic names and file IDs of the processor files in the root directory, but also lists the symbolic names and file IDs of the subdirectory files defining the subdirectories in the root directory. Each subdirectory file, in turn, lists the symbolic names and file IDs of the processor files and subdirectory files therein. The headers of the subdirectory files include the same information as the headers of processor files, for example, the date the subdirectory file was created, the last revision date, and rights information.

When an operator, using an application program, needs to use a file, it can be located in the computer system by generating a request identifying the symbolic names of the directories, starting with the root directory down to the directory which contains the file, as well as the symbolic file name.

To locate the requested file, the computer system iteratively reads the headers and contents of each directory file from the root directory to the directory containing the requested file. In each iteration, the computer system retrieves the header of a directory file, uses this file header to retrieve the contents of the directory file, searches the directory file contents to find the symbolic name of the next required subdirectory file, locates the symbolic name and file ID of the next required subdirectory file, uses the file ID of the next required subdirectory file to retrieve (from the index file) the subdirectory's file header, which is used to begin the next iteration.

Once the header of the directory file for the directory containing the requested file is retrieved, the computer system then searches the contents of the directory file for the symbolic name of the file, locates the symbolic name and file ID of the requested file, uses the file ID of the requested file to retrieve (from the index file) the requested file's file header, which may then be used to locate the requested file information.

Since all files, including those files which contain the information of directories (directory files), are maintained in secondary storage, locating information in a file in a directory system having a number of levels can be time-consuming. To reduce this, the computer system typically maintains several caches in memory, for example, caches of recently-used file headers, and file contents, including directory files, as well as other miscellaneous file information, which are used to locate directories and files in the secondary storage device. The caches reduce the time required to locate directories and files since the information in the caches in memory can generally be read by the processor in much less time than the same information in secondary storage.

SUMMARY OF THE INVENTION

The invention provides a new and improved cache for locating directory and file information in a digital data processing system.

In brief summary, the new cache is used by a file manager in connection with a file system including a plurality of files each stored in one of a plurality of hierarchically-organized directories. The cache comprises a plurality of file header cache entries each for caching information concerning a file, and a plurality of directory cache entries each for caching information concerning a directory. There is a cache for file content entries as well. A cache manager establishes correspondences between the directory cache entries and the file header cache entries, and between the file header cache entries and the content cache entries.

Preferred embodiments include the following features.

The file header cache entries comprise a doubly linked list and the directory cache entries comprise a second doubly linked list. There is a third doubly linked list for file content cache entries.

The cache includes a cache retrieval portion and an entry establishment portion. The cache retrieval portion is responsive to cache retrieval requests from the file manager for retrieving information from the file cache entries and the directory cache entries for use by the file manager. The entry establishment portion operates in response to storage cache requests to establish new file header cache entries, file content cache entries, and directory cache entries.

Replacement

The cache manager further includes a replacement control portion that controls identification of entries to be replaced by the entry establishing portion to thereby create new entries. In operation, the replacement control portion makes use of the associations between the directory linked list and the file linked list. For example, in response to the cache manager processing a cache retrieval of a directory or file, the replacement control portion establishes the related directory entry and all of the directory's associated file entries as the most recently used in their respective lists. When the entry establishment portion needs to use a current directory entry to establish a new directory entry, it selects the least recently used directory entry; similarly, when the entry establishment portion needs to use a current file entry to establish a new file entry, the least recently used file entry of the least recently used directory is selected. The system favors maintaining a relatively large number of directory entries in the unused list.

Aging

The cache is purged of file headers and file contents entries which have not been used recently, but which are stored in directories that have been used recently (and thus are not removed by the mechanisms described above). To accomplish this, used indicators are stored in the file header entries. The used indicator is set whenever a file header entry or a related file content entry is used; periodically, the file header entries which do not have their used indicators set are removed from the cache, along with the file contents entries associated with those file header entries. At the same time, the used indicators of the remaining file cache entries are cleared. When no more file headers are present under a directory, the directory entry is removed from the cache.

Prefetching

When a file header entry which was not in the cache is added to the cache, other file header entries are prefetched into the cache. The number of file headers prefetched may be unlimited, or it may be limited to a maximum number such as four; however, if a limit is used, additional headers may be prefetched if there are unused entries available to provide space for the additional headers.

The prefetched file headers may be chosen at random, or the cache manager may prefetch only those files or directories bearing a predetermined relationship to the retrieved file header. For example, when a file header entry is added to the cache, the entries for file headers of other files in the same directory may prefetched into the cache. Further, only those file headers having symbolic names related to the symbolic name of the retrieved file (such as having common prefixes or suffixes, or common substrings) may be prefetched into the cache. File content entries related to the blocks of a file in secondary storage may be prefetched when either a file control or access operation is performed for that particular file.

Quotas

In addition, the cache manager establishes quotas which limit the amount of file information stored in the cache on a per directory and per file basis across several hierarchical levels in the cache. For example, a quota is established on the number of files from any given directory allowed in the cache, which prevents one directory from dominating the cache. Similarly, a quota is maintained on the number of file content entries for a particular file.

Maintaining the lists of directory cache entries and file cache entries in a cross-referenced manner, as described above, can provide advantages, both in time required to use the various entries and in selection of an entry to be replaced when a new entry needs to be established. Users tend to store processor files in directories in a contextual fashion, i.e., with files related to a particular application program stored in one or a few common directories. Similarly, applications tend to access processor files in a localized manner, that is, in one or a small set of directories or in a directory and its relative subdirectories. By maintaining the association between a directory cache entry and file cache (headers and contents) entries, the invention can determine which directories have been used recently, and use this information to retain files in recently used directories which would otherwise have been removed from the cache. Where files are accessed in a highly contextual manner, this scheme enhances the likelihood that a required file cache entry will be in the cache. Prefetching and the use of quota are also instrumental for improvement of performance.

Thus, in general, the invention features, in one aspect, a method for caching information needed by application programs from a secondary storage in which the cache memory is organized in multiple levels, each level having multiple entries, the entries of each level receiving information of a predetermined category, each entry being accessible independently. Links are defined between entries of one level of the cache memory and entries at another level of the cache memory, the links corresponding to information relationships specified by a user of information stored in the secondary storage. The use and reuse of the cache entries is based on the links.

In general, in another aspect the invention features a caching method which includes: in response to a request to a file system from an application for needed information, fetching the needed information into the cache, and in connection with fetching the needed information, prefetching other information from the system of files which is not immediately needed. In some cases the contents of the file may be prefetched.

In general, in another aspect the invention features a caching method in which quotas are established on information which may be fetched from a secondary storage into the cache, the quotas being applicable to portions of the files determined based on user defined relationships of the information in the secondary storage. The fetching of information from secondary storage into the cache is regulated based on the quotas.

In general, in another aspect the invention features a method for caching information needed by application programs from files of information organized in a system of files, the system including directories, file headers, and file contents stored in a secondary storage. In the method, upon a request from an application program to open a file, an entry is created in a cache corresponding to the file, the entry including file header information. The file header information is retained in the cache so long as the file remains open, whether or not any file contents of the file remain in cache.

In general, in another aspect, the invention features organizing cache memory in at least three levels, each level having multiple entries, the entries of the three levels respectively receiving directory information, file header information, and file contents information, each entry being accessible independently; links are defined between entries of one level of the cache memory and entries at another level of the cache memory, the links corresponding to information relationships specified by a user of information stored in the secondary storage.

Other features and advantages of the invention will be apparent from the following description of the preferred embodiment and from the claims.

BRIEF DESCRIPTION OF THE DRAWINGS

FIGS. 3A through 3C depicts data structures of various elements in the cache system depicts in FIG. 2; and FIGS. 4-1 through 4E-3 depict flow diagrams useful in understanding the operation of the cache system depicted in FIG. 2.

DESCRIPTION OF THE PREFERRED EMBODIMENT

Figure 1:
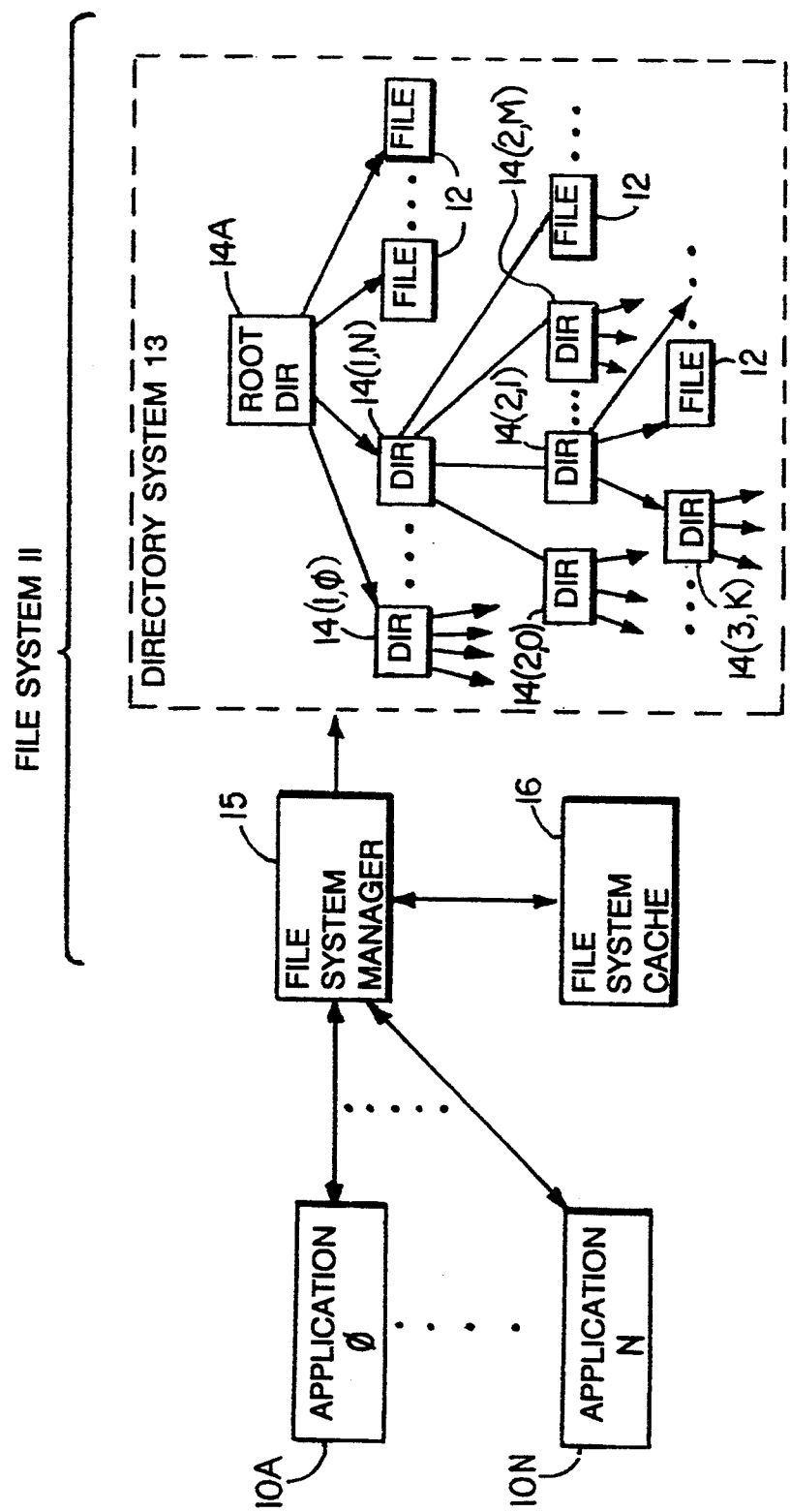
FIG. 1 depicts a functional block diagram of a file system useful in understanding the invention.

FIG. 1 depicts a functional block diagram of a computer system useful in understanding the invention. With reference to FIG. 1, the computer system includes one or more application programs 10A through 10N (generally identified by reference number 10) which, under control of an operator (not shown), operate on information maintained by a file system 11. The file system 11 maintains information used by an application program 10 in the form of processor files, generally identified by reference numeral 12, organized in a hierarchical tree-structured directory system 13. The directory system 13 in the file system 11 is maintained and managed by a file system manager 15, which receives requests from application programs 10 for performing access or control operations on processor files 12. Typically, a control (e.g., open) operation precedes an access (e.g., read or write) operation. The file system manager 15, upon receiving a control or access request from an application program 10, also uses a file system cache 16 to aid in locating the requested file, thus reducing the time necessary to perform the access or control operation requested by the application program 10. Also the file system cache is used to reduce the time for accessing the file contents in access operations (e.g., read or write).

As noted above, the file system 11, and specifically, the file system manager 15, maintains the directory system 13 organized in a hierarchical structure. The directory system 13 includes a number of directories (generally identified by reference numeral 14) including, at the highest level, a root directory 14A. Each directory 14 at a level beneath the root level constitutes a subdirectory relative to a directory at the next level higher. The root directory 14A may include a number of subdirectories 14(1,O) through 14(1,N) and processor files 12. (In the reference numeral for the subdirectories, 14(i,j), index "i" identifies the directory level, beneath the root directory, of the subdirectory, and index "j" identifies the particular subdirectory within its directory level.) Each directory 14(1,j) in the directory level directory beneath the root directory 14A may also include, as subdirectories, a number of directories 14(2,j) and processor files 12. For example, in the directory system depicted in FIG. 1, the directory 14(1,N), which is a subdirectory of the root directory 14A, includes, as subdirectories, directories 14(1,O) through 14(1,M), aswell as processor files 12, and directory 14(2,1) includes, as subdirectories, directories 14(3,O) through 14(3,K) and processor files 12.

While the directories 14 in the directory system 13 depicted in FIG. 1 are shown as including both subdirectories and processor files, it will be appreciated that any particular directory 14 may include only subdirectories, or only processor files, or a combination of directories and processor files. If a directory does not include subdirectories, there are no further subdirectory levels beneath that directory.

Although not shown in the Figures, it will be appreciated by those skilled in the art that the computer system depicted in FIG. 1 is distributed over hardware in the form of a processor, memory and input/output system that includes a secondary storage system. The application program 10, file system manager 15 and file system cache 16 are in the form of computer programs and data processed by the processor, and the directory system 13 is maintained in secondary storage.

When an application 10 requires blocks of a processor file 12 in its processing, the file system manager 15 transfers a copy of the required blocks of the processor file 12 from secondary storage to the memory, where it can be processed by the application 10. (In this context, a block refers to a "chunk" of a file; the size of a block of a processor file may be operating system dependent. A block of a processor file may correspond to one or more blocks in the secondary storage.) In addition, on command from an application 10, the file system manager 15 may transfer blocks of the processor file 12 which have been modified during processing from memory to secondary storage, thereby updating the processor file 12 in the secondary storage. These operations can be costly in both processing cycles and secondary storage access, which is a motivation for caches.

Cache Structure

Figure 4:
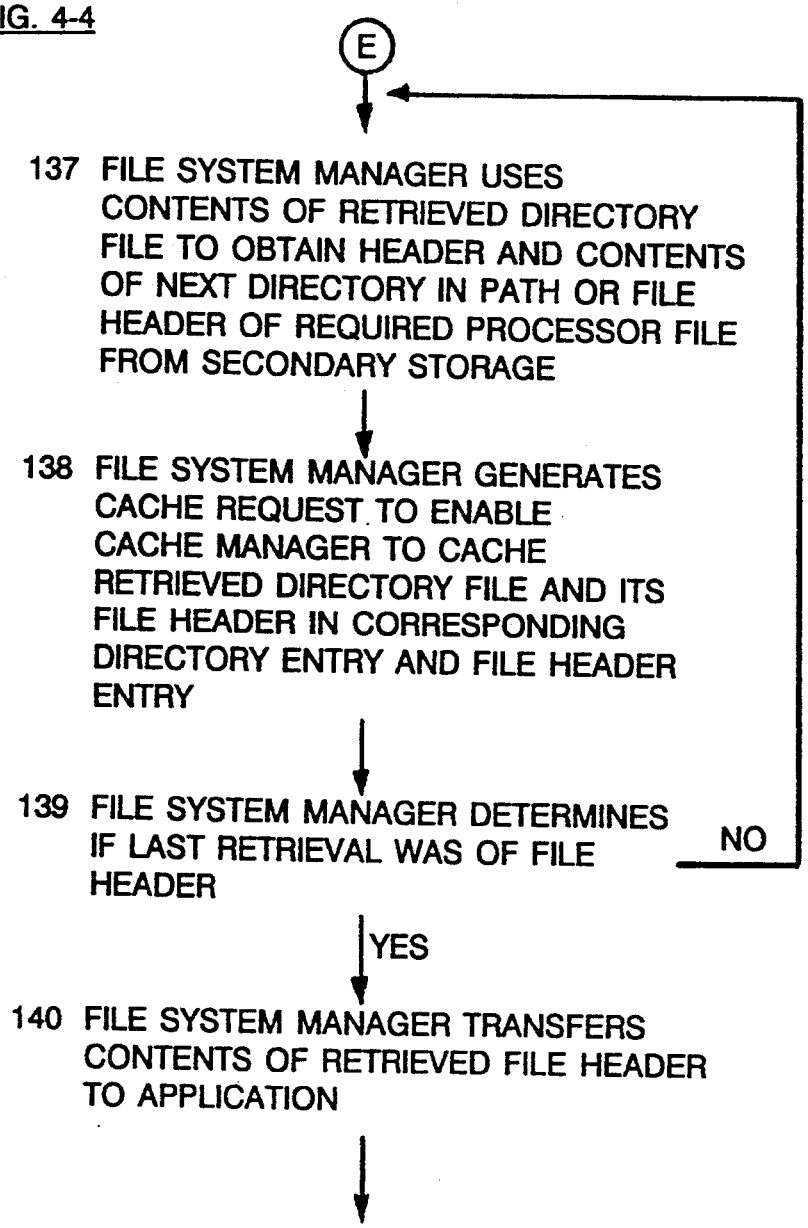
Figures 1, 4B:
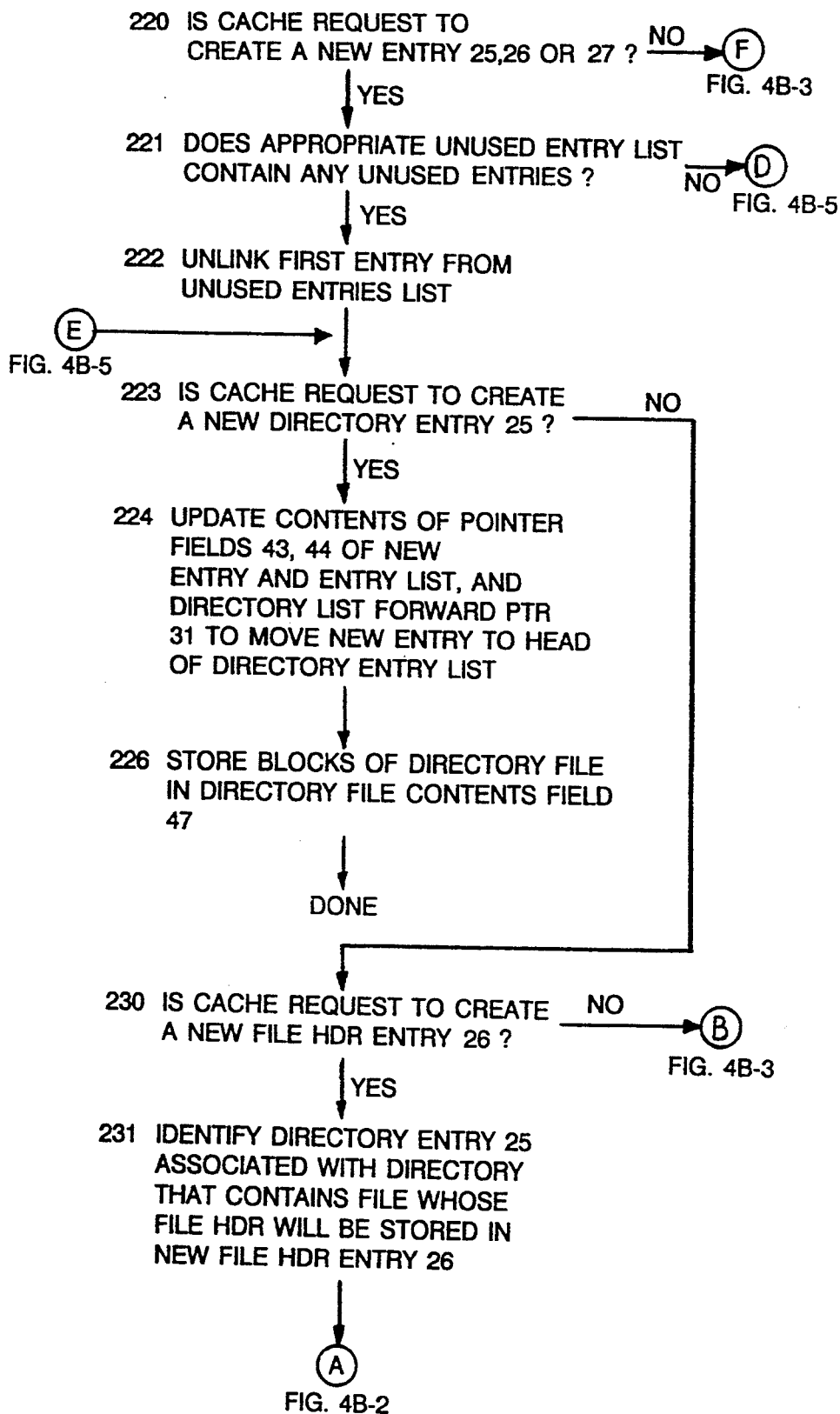
Figure 4C:
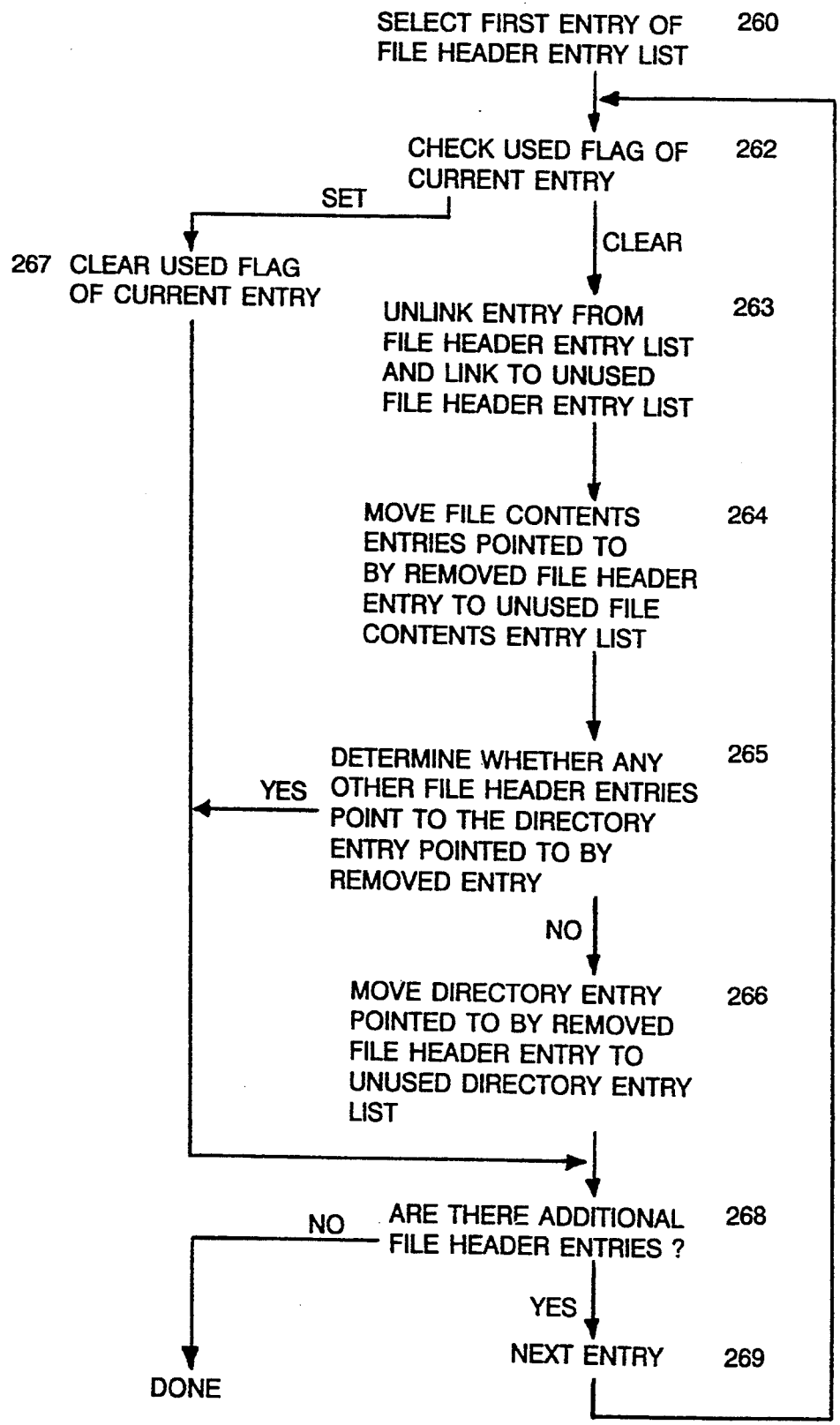
Figures 1, 4D:
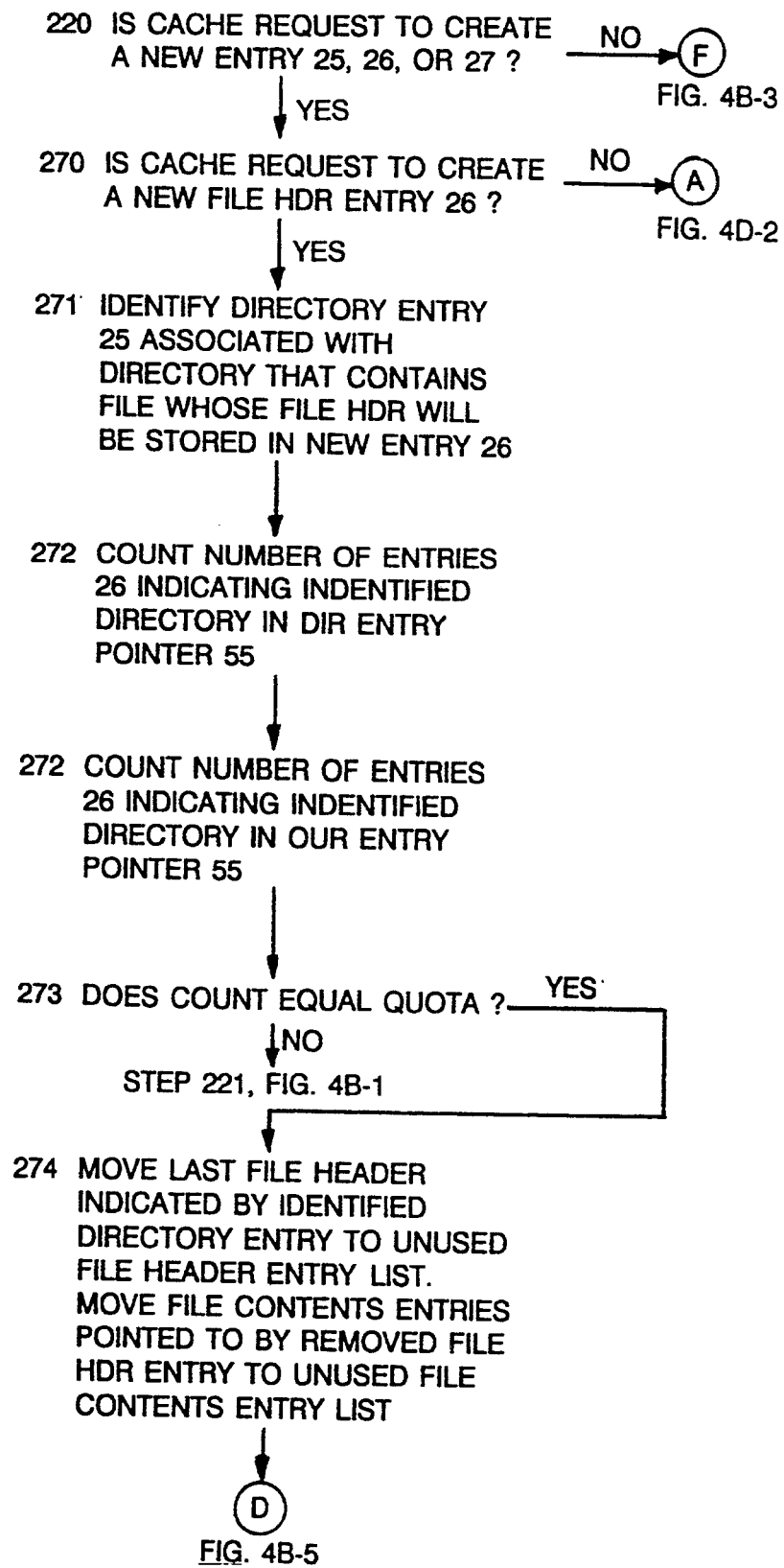
Figures 2, 4D:
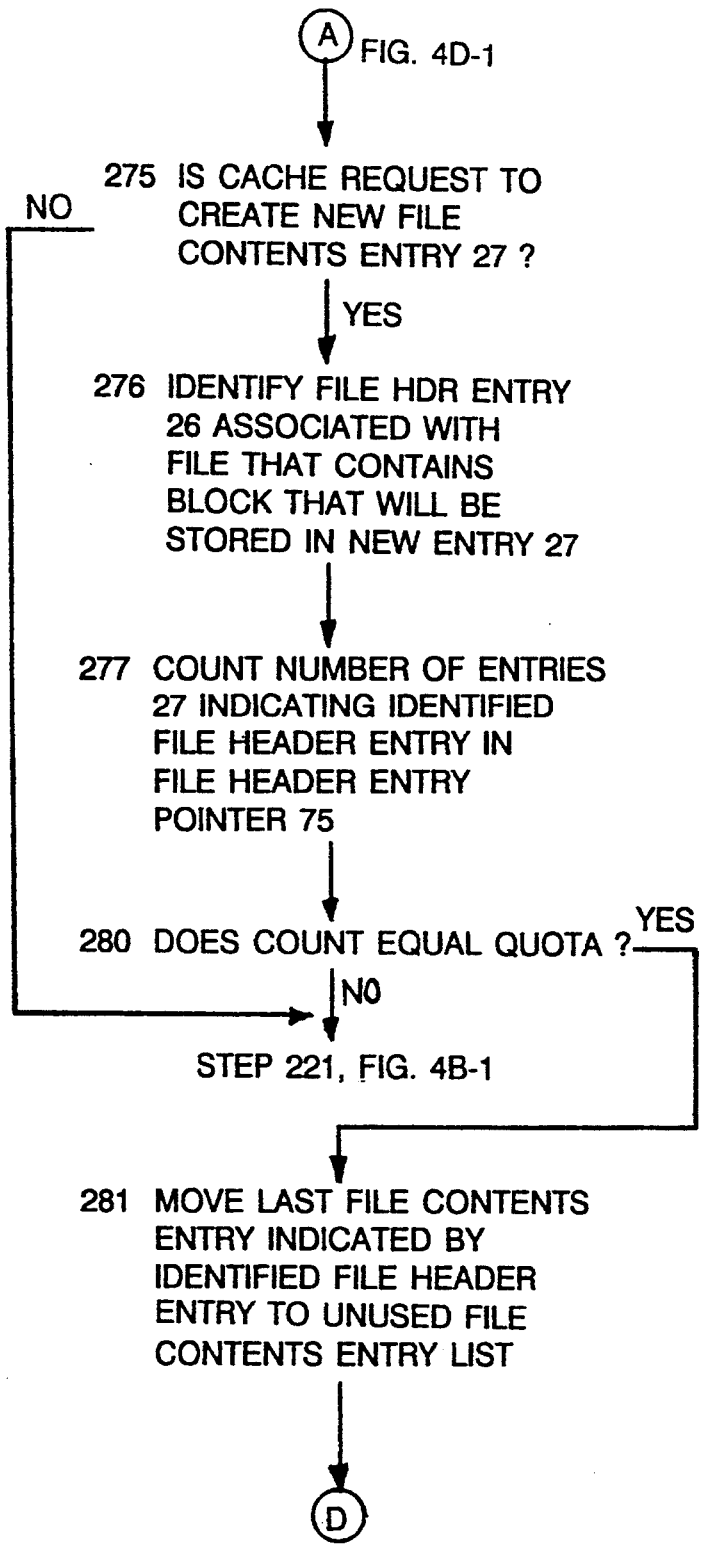
FIG. 2 depicts a block diagram of a cache system useful in the computer system depicted in FIG. 1.

FIG. 2 depicts the organization of the file system cache 16, constructed in accordance with the invention. With reference to FIG. 2, the file system cache 16 includes a cache manager 20 and a cache store 21. The cache manager 20 operates in response to a cache request from the file system manager 15 to store information, including information from directory files defining directories 14, file headers of processor files 12 and file data from the processor files 12 in the cache store 21, and retrieves it on request from the file system manager 15.

The cache store 21 of file system 16 maintains caches of the various file information required by the cache manager 20. One such cache is depicted in FIG. 2. The cache depicted in FIG. 2 includes a plurality of storage entries organized into three interconnected lists, including a directory entry list 22, a file header entry list 23, and a file contents entry list 24.

The directory entry list 22 includes one or more directory entries, generally identified by reference numeral 25, which store information from the directory files defining directories 14 that were recently used by the file system manager 15 while responding to a file control request. The file header entry list 23 includes one or more file header entries, generally identified by reference numeral 26, which store information from the file headers of recently used processor files 12. Similarly, the file contents entry list 24 includes one or more file contents entries, generally identified by reference number 27, which store blocks of data from recently used processor files 12.

As shown in FIG. 2, the directory entries 25 in the directory entry list 22 are organized as a doubly linked list. That is, the first directory entry 25A includes a forward pointer (which is represented by an arrow), as described below in connection with FIG. 3A, to the second directory entry 25B, the second directory entry 25B includes a pointer to the third directory entry 25C and so on. In addition, each directory entry includes a backward pointer to the previous directory entry. Similarly, the file header entries 26 in the file header entry list 23 form another doubly linked list, and the file contents entries 27 in the file contents entry list 24 form yet another doubly linked list.

In addition, each directory entry 25 includes a pointer to a file header entry 26. As shown in FIG. 2, directory entry 25A includes a pointer to file header entry 26A, directory entry 25B includes a pointer to file header entry 26D and directory entry 25C includes a pointer to file header entry 26E. If the directory entry list 22 includes any additional directory entries 25, those directory entries 25 will also include pointers to other file header entries 26 in the file header entry list 23. The sequence of file header entries 26A through 26C in the file header entry list 23 comprise file headers of processor files 12 in the directory 14 associated with the information in directory entry 25A, that is, the directory 14 defined by the information in directory entry 25A. Similarly, file header entry 26D in the file header entry list 23 comprises the file header of a processor file 12 in directory 14 associated with the information in directory entry 25B, and the file header entry 26E, and any successive file header entries in the file header entry list 23, up to a file header entry 26 pointed to by the next directory entry, if one exists, comprise the file headers of processor files 12 in the directory 14 associated with the information in directory entry 25C. Accordingly, the sequence of file header entries 26 in the file header entry list 23, beginning with the entry 26(j) pointed to by a directory entry 25(i) in the directory entry list 22 through entry 26(k), which is one before the entry 26(k+1) pointed to by the next directory entry 25(i+1), all contain file headers of processor files 12 in the directory 14 associated with the information in the directory entry 25(i) in the directory entry list 22.

Similarly, the file entries 27 in the file contents entry list 24 form a linked list, with each file contents entry 27 including a pointer to the next succeeding file contents entry 27 in the file contents entry list 24. In addition, each file header entry 26 in the file header entry list 23 includes a pointer to a file contents entry 27. As shown in FIG. 2, file header entry 26A includes a pointer to file contents entry 27A, file header entry 26B includes a pointer to file contents entry 27D and file header entry 26C includes a pointer to file contents entry 27G. Additional file header entries 26 also include pointers to other file contents entries 27 in the file contents entry list 24. The file contents entries 27A through 27C in the file contents entry list 24 contain blocks of the processor file 12 whose file header is in file header entry 26A. Similarly, file contents entries 27D and 27F in the file contents entry list 24 contain blocks of the processor file 12 whose file header is in file header entry 26B, and so forth. Accordingly, the sequence of file entries 27 in the file contents entry list 24, beginning with the file contents entry 27(j) pointed to by file header entry 26(i) in the file header entry list 23 and extending up to the file contents entry 27(k), which is one before the file contents entry 27(k+1) pointed to by the next file header entry 26(i+1), all contain blocks of the processor file 12 whose header is stored in file header entry 26(i).

The three doubly-linked lists, namely directory entry list 22, file header entry list 23 and file contents entry list 24, are all defined by pointers in a cache list header 30. The cache list header 30 includes a pointer to the first entry and last entry in each of the lists 22, 23 and 24 to define and simplify using of the entries in the lists. In particular, the cache list header 30 includes a directory list forward pointer 31 which points to the first entry 25A in the directory entry list 22, and a directory list backward pointer 32 which points to the last entry 25 in the directory entry list 22. The first directory entry 25A in the directory entry list 22 also includes a pointer that points to the directory list forward pointer 31 and the last directory entry 25 includes a pointer that points to the directory list backward pointer 32. Thus, the directory entries 25 in the directory entry list 22 are linked, with the pointers 31 and 32, in the forward direction, that is, going down the list from the first directory entry 25 to the last directory entry 25, and in the reverse direction going from the last directory entry 25 to the first directory entry 25.

Similarly, the cache list header 30 includes a file header list forward pointer 33 which points to the first entry 26A in the file header entry list 23, and a file header list backward pointer 34 which points to the last file header entry 26 in the file header entry list 23. The first file header entry 26A in the file header entry list 23 also includes a pointer that points to the file header list forward pointer 33 and the last file header entry 26 includes a pointer that points to the file header list backward pointer 34. Thus, the entries 26 in the file header entry list 23 are linked, with the pointers 33 and 34, in the forward direction, that is, going down the list from the first entry 26A to the last file header entry 26, and in the reverse direction going from the last file header entry 26 to the first file header entry 26A.

In addition, the cache list header 30 includes a file contents list forward pointer 35 which points to the first entry 27A in the file contents entry list 24, and a file contents list backward pointer 36 which points to the last entry 27 in the file contents entry list 24. The first file contents entry 27A in the file contents entry list 24 also includes a pointer that points to the file contents list forward pointer 35 and the last file contents entry 27 includes a pointer that points to the file contents list backward pointer 36. Thus, the entries 27 in the file contents entry list 24 are linked, with the pointers 35 and 36, in the forward direction, that is, going down the list from the first entry 27A to the last entry 27, and in the reverse direction going from the last entry 27 to the first entry 27A.

Finally, the cache list header 30 includes six pointers, two of which, identified by reference numerals 37 and 38, are illustrated in FIG. 2. The six pointers point to entries in three doubly-linked unused entry lists, one of which, unused directory entry list 29, is illustrated in FIG. 2. Each unused entry list comprises a linked list, similar to list 22, 23 and 24, of entries which the cache manager 20 may use when it needs to create a new entry 25, 26 or 27 for the respective lists 22, 23 and 24, as described below. In particular, the unused directory entry list 29, comprises a linked listed of unused directory entries 28. The cache list header 30 includes an unused directory list forward pointer 37 which points to the first unused directory entry 28A in the unused directory entry list 29, and an unused directory list backward pointer 38 which points to the last unused directory entry 28 in the unused directory entry list 29. The first unused directory entry 28A in the unused directory entry list 29 also includes a pointer that points to the unused directory list forward pointer 37 and the last unused directory entry 28 includes a pointer that points to the unused directory list backward pointer 39. Thus, the entries 28 in the unused directory entry list 29 are linked, with the pointers 37 and 38, in the forward direction, that is, going down the list from the first unused directory entry 28A to the last unused directory entry 28, and in the reverse direction going from the last unused directory entry 28 to the first unused directory entry 28A.

Similar link lists (not shown) store unused file header entries and unused file contents entries. These lists are also linked by pointers (not shown) in cache list header 30. Note that the first and last entries in each of these lists 22, 23, 24 need not necessarily point precisely to the respective forward and backward pointers in the cache list header. It is adequate to point to the cache list header itself, and then locate the appropriate pointer by simply computing an offset into the cache list header.

Cache Entry Structure

Before describing the operations of the file system manager 15 and cache manager 20 in response to a control request from an application program 10, it would be helpful to describe the data structures comprising entries 25 through 27, which are depicted in FIGS. 3A through 3C. With reference to FIG. 3A, a directory entry 25 includes a number of fields, including two groups of fields, namely a cache control field group 40 and a directory information field group 41.

The cache control field group 40 of a directory entry 25 includes the pointers to other directory entries 25 in the cache store 21, including a directory entry forward pointer 43, a directory entry backward pointer 44 and a file header entry pointer 45. The directory entry forward pointer 43 points to the next directory entry 25, and the directory entry backward pointer 44 points to the previous directory entry 25, in the linked list comprising the directory entry list 22, thereby linking the entry 25 to other entries 25 to form the directory entry list 22. The directory entry backward pointer 44 of the first directory entry 25A points to the directory list forward pointer 31 in cache list header 30, and the directory entry forward pointer 43 in the last directory entry 25 points to the directory list backward pointer 32, thereby linking the directory list 22 to the pointers 31 and 32 in the cache list header 30.

In the cache control field group 40, the file header entry pointer 45 points to a file header entry 26 in the file header entry list 23, thereby creating a link from the directory entry 25 to the first file header entry 26 in the sequence in file header entry list 23 associated with the directory entry 25. The cache manager 20 uses the pointers in fields 43 through 45 to navigate through the entries 25 and 26 in the cache store 21 as described below in connection with FIGS. 4-1 through 4-C.

The directory information field group 41 also comprises a number of fields, including a directory file ID field 46, which stores the file ID of the directory file associated with the directory entry 25. A directory file contents field 47 is also included in the directory entry; this field stores a fixed number of blocks of the contents of the directory file associated with the directory entry 25. If there are more blocks in the directory file than will fit in the allotted space, the blocks stored in the directory entry 25 may be replaced according to, for example, a least-recently-used scheme. (Such a least-recently-used scheme enhances performance but is not required.) Alternatively, an implementation could acquire portions of free memory for storing the additional blocks of directory file contents. The additional memory would be linked by a pointer to the original directory entry in the cache, and a maximum number of blocks that may be associated with one directory entry would be established.

A file header entry 26 also includes a number of fields, which are depicted in FIG. 3B. With reference to FIG. 3B, a file header entry 26 includes two groups of control fields, namely a cache control field group 50 and a file header control field group 51, and a file header cache data field 52 for storing the contents of the file header. The cache control field group 50 includes the pointers to other entries in the cache store 21, including a file header entry forward pointer 53, a file header entry backward pointer 54, a directory entry pointer 55, and a file contents entry pointer 56. The file header entry forward pointer 53 points to the next file header entry 26, and the file header entry backward pointer 54 points to the previous file header entry 26, in the linked list comprising the file header entry list 23, thereby linking the file header entry 26 to other entries 26 to form the file header entry list 23. The file header entry backward pointer 54 of the first file header entry 26A points to the file header list forward pointer 33 in cache list header 30, and the file header entry forward pointer 53 in the last file header entry 26 points to the file header list backward pointer 34, thereby linking the file header 23 to the pointers 33 and 34 in the cache list header 30. A simpler singly linked list using only forward pointers would probably be adequate and more efficient.

Further, in the cache control field group 50 of a file header entry 26, the directory entry pointer 55 points to the directory entry 25 which is associated with the directory 14 that contains the processor file 12 associated with the file header contained in the file header entry 26, thereby linking the file header entry 26 to an entry 25 in the directory entry list 22. The file contents entry pointer 56 points to a file contents entry 27 in the file contents entry list 24, thereby creating a link between file header entry 26 and a file contents entry 27, namely, the first file contents entry 27 in the sequence of file contents entries 27 associated with the file header 26. The cache manager 20 uses the pointers in fields 53 through 56 to navigate through the entries 25 through 27 in the cache store 21 as described below in connection with FIGS. 4-1 through 4C.

The file header control field group 51 also comprises a number of fields, including a file ID field 57, which stores the file ID of the file 15 associated with the file header entry 25. In addition, a protection field 61 may store, for example, file lock information, which is useful if multiple applications 10 (FIG. 1) may concurrently use the file associated with the file header in file header cache data field 52. In addition, protection field 61 may store information indicating whether the file is open or closed. A used flag 62 indicates whether the file header entry 26 was used in connection with a file operation since the last aging operation, as described below in connection with FIGS. 4-1 through 4C.

Similarly, a file contents entry 27 includes a number of fields, which are depicted in FIG. 3C. With reference to FIG. 3C, file contents entry 27 includes a number of fields, including two groups of control fields, namely a cache control field group 70 and a file contents control field group 71, and a file block contents cache data field 72 for storing the contents of a block of the processor file 12. The cache control field group 70 includes the pointers to other entries in the cache store 21, including a file contents entry forward pointer 73, a file contents entry backward pointer 74 and a file header entry pointer 75. The file contents entry forward pointer 73 points to the next file contents entry 27, and the file contents backward pointer 74 points to the previous file contents entry 27, to form the file contents entry list 24. The file contents entry backward pointer 74 of the first file contents entry 27A points to the file contents list forward pointer 35 in cache list header 30, and the file contents entry forward pointer 73 in the last file contents entry 27 points to the file contents list backward pointer 36, thereby linking the file contents list 24 to the pointers 35 and 36 in the cache header list 30. A simpler single linked list using only forward pointers would probably be adequate and more efficient.

Further, in the cache control field group 70 of a file contents entry 27, the file header entry pointer 75 points to a file header entry 26 in the file header entry list 23 and constitutes a backward link to the file header entry 26 in the file header entry list 23 containing the file header of the processor file 12 which supplied the information in file block contents cache data field 72. The cache manager 20 uses pointers in fields 73 through 75 to navigate through the entries 26 and 27 in the cache store 21 as described below in connection with FIGS. 4-1 through 4C.

The file contents control field group 71 of a file contents entry 27 also comprises a number of fields, including a file ID field, which stores the file ID of the processor file associated with the file contents entry 75. In addition, if protection is provided for file blocks, a file block protection field 80 is included in the cache so that control information, including, for example, file block lock information (which is useful if multiple application programs 10 may concurrently operate on the block of processor file 12) is readily available in the cache.

The structure of the unused entries in each of the three unused entry lists is identical to that of the entries 25, 26 and 27 of the corresponding lists 22, 23, and 24. Thus, the entries can provide sufficient space in which cache manager 20 may store information when it uses an unused entry from the appropriate unused entry list to create an entry 25, 26 or 27. While an unused entry is linked into the unused entry list, it has a forward pointer and a backward pointer, which are generally similar to, and used in a manner similar as, for example, forward pointer 73 and backward pointer 74, respectively, in file contents entry 27 (FIG. 3C), to create the unused entry lists and link them to the unused entry list pointers in cache header list 30.

Cache Operations

The operations performed by cache manager 20 will be described in connection with FIGS. 4-1 through 4C. As noted above, the cache manager 20, under control of the file system manager 15, stores information, including information from files defining directories 14, file headers of processor files 12 and file data from the processor files 12, in the various entries 25, 26 and 27 in the cache store 21, and retrieves the information stored in the entries on request from the file system manager 15. By way of background, to place the specific operations of the cache manager 20 in connection with the cache store 21 in context, the operations performed by the file system manager 15, in combination with the file system cache 16 and the directory system 13 located in the computer's secondary storage, in response to a control request from an application 10, will be generally described in connection with FIGS. 4-1 through 4-5.

In a typical operation, the file system manager 15 initially receives a control request from an application program 10. If the request relates to a processor file 12, it includes a file identifier, including the name(s) of the series of directories 14(i,j) in the directory hierarchy defining a path from the root directory 14A to, and including, the directory 14 that contains the processor file 12. (If the file identifier specifies no directory names, the file system manager 15 concludes that the processor file is in the user's "current" directory—the identity of which is set by each user. Because the identity of the current directory and other recently used directories is often required to locate files on the secondary storage device, the identities of these directories is typically stored in a separate "path string" cache, which stores information similar to that stored in the index file. (The path string cache is not shown in FIG. 2) If, on the other hand, the request relates to a directory, for example, a request to list the contents of a directory, the request will just identify a path of directories 14(i,j) from the root directory 14A. In addition, it will be appreciated that a control request may also include a particular secondary storage identifier identifying a particular secondary storage device in the computer system if each secondary storage device maintains a separate directory system 13.

For example, a request indicating disk1:[A.dir,B.dir,C.dir]foo.bar relates to the file having the symbolic name "foo.bar", which is located in the directory (stored in the directory file) having the symbolic name "C.dir", which is a subdirectory of the directory having the symbolic name "B.dir", which is a subdirectory of the directory having the symbolic name "A.dir", which is a subdirectory of the root directory of the file structure of the secondary storage device having the symbolic name "disk1".

An application 10 may issue several types of control requests, each initiating a corresponding type of file operation. In particular, one type of file operation is an open file operation, which the application 10 uses to notify the file system manager 15 that it will thereafter need to access, that is, read data from and/or write data to, the processor file 12. Another type of control operation in connection with a processor file 12 is a close file operation, which the application 10 uses to notify the file system manager 15 that it will not thereafter need to access the processor file 12. Between an open file operation and a close file operation, the application may access the processor file through access requests that enable the file system manager to either retrieve data from, or store data in, the processor file 12.

It will be appreciated that, once a file has been opened with a control request, the locations of the blocks of the file are read from the file's header into memory and are thereafter available to the processor. Therefore, once a control request has been fulfilled, it usually is not necessary to fetch the file header to perform accesses, i.e., reads or writes, on the file. (There is one exception to this: there may be more blocks in the file than can be stored in the "window" of blocks (mapping file blocks to locations on secondary storage) available in a single access to the file header on a control request. In such a case, a second "window", or continuation of the contents of the file header, indicating storage of the remaining file contents on secondary storage, may need to be accessed. Under these circumstances, the file header may need to be used again when accessing the second window of the file.)

For the above reason, the description of cache usage below will be directed to the satisfaction of a control request and then to an access request.

Control Request

With reference to FIG. 4-1, in response to the receipt of a control request to, for example, open or close a particular processor file 12 (step 114), the file system manager 15 initially looks to the file system cache 16, generating a cache request to determine whether the file header of the processor file is in a file header entry 26 in the cache store 21 (step 114). If the cache manager 20 determines that a file header entry 26 contains the requested file header (step 115), it transfers the data in the file header entry's file header cache data field 52 to the file system manager 15 (step 116). The operations performed by the cache manager in connection with this are described below in connection with FIGS. 4A-3 and 4A-4.

If the cache manager 20 determines in step 115 that the requested file header is not in the cache store 21, the file system manager 15 generates a cache request to determine whether the directory entry list 22 contains a directory entry 25 for the last directory 14 specified in the request, i.e., an entry for the directory that contains the requested processor file (step 122).

If the cache manager 20 determines that such a directory entry 25 exists (step 123), it then determines if the directory entry's directory file contents field 47 is storing the block of the directory file containing the file ID of the requested file (step 124). If the directory file contents field is storing the appropriate block, the cache manager then transfers the file ID from the directory entry's directory file contents field 47 to the file system manager 15 (step 125). The operations performed by the cache manager 20 in connection with this step are described below in connection with FIGS. 4A-1 and 4A-2. The file system manager thereafter uses the retrieved file ID, and the index file, to locate the requested file header. In addition, the file system manager enables the cache manager to store the header of the processor file 12 in an entry 26 in the cache store 21 (step 127), as described below in connection with FIGS. 4B-1 and 4B-2, which depict creation of a new file header entry 26.

If, on the other hand, the cache manager 20 determines in step 123 that the cache store 21 does not contain a directory entry 25 for the last directory 14 in the hierarchical directory system 13 that includes the requested file header, the file system manager 15, using steps 131 through 135, iteratively steps up the directory path provided in the request toward the root directory 14A to locate a directory for which the directory entry list 22 contains a directory entry 25. In each iteration, the file system manager 15 generates a cache request that identifies the directory 14 at the particular level in the hierarchical directory system 13 (step 131). The cache manager 20 processes the cache request, as described below in connection with FIGS. 4A-1 and 4A-2, to determine whether the directory entry list 22 contains a directory entry 25 for the identified directory 14 (step 132). If the cache manager determines that such a directory entry 25 exists (step 132), it then determines if the directory entry's directory file contents field 47 is storing the block of the directory file containing the file ID of the required directory file (step 133). If the directory file contents field is storing the appropriate block, the cache manager then returns the file ID from the appropriate block in the directory file contents field 47 to the file system manager (step 134).

The file system manager 15 ceases the iterations when either (1) the cache manager 20 has returned the file ID from the appropriate block in the directory file contents field 47 of the directory entry 25 for the directory identified in the cache request (step 134), (2) the appropriate block cannot be found in the directory file contents field 47 of the directory entry 25 for the directory identified in the cache request (step 133) or (3) the next cache request will relate to the root directory 14A (step 135). If the iterations cease as a result of satisfaction of the third termination criteria, that is, if the next cache request will relate to the root directory 14A, the file system manager 15 retrieves the root directory file and transfers the file ID of first directory 14B specified by the request to the file system manager (step 136).

However, if (1) a directory entry 25 is found for the directory containing the requested file header, but the block of the directory file listing the file ID of the requested file cannot be found in the directory file contents field 47 of the directory entry (step 124), or (2) a directory entry 25 is found for a higher level directory specified in the request, but the block of the directory file listing the file ID of the required subdirectory cannot be found in the directory file contents field 47 of the directory entry, then the cache manager determines whether the directory file's file header is cached in the file header entry list 23 (step 128). If not, the cache manager uses the file ID of the directory file to obtain the directory file's file header from secondary storage, and generates a cache request to cache the file header in the file header entry list 23 (step 129). This operation is described below with reference to FIGS. 4B-1 and 4B-2, with the caveat that, when a file header of a directory file is added to the cache, there are no file contents entries below the file header entry because the contents of the directory files are stored in the directory entries; therefore, step 235 (FIG. 4B-2) may be skipped for directory file headers.

Whether the directory file's file header is retrieved from the cache or from secondary storage, the file header is used to locate the appropriate block of the directory file's contents from secondary storage, and make the file ID of the requested processor or directory file available to the file system manager (step 130). After retrieving the appropriate block, the cache manager places the block into the directory file contents field 47 in place of the least-recently-used block in the directory file contents field, thus making the block available in the cache for future requests. Alternatively, an implementation could acquire portions of free memory for storing the additional blocks of directory file contents. The additional memory would be linked by a pointer to the original directory entry in the cache, and a maximum number of blocks that may be associated with one directory entry would be established.

After receiving the file ID of a required subdirectory or the requested file header from a directory file of a directory 14, either of the root directory 14A or of another directory 14, the file system manager 15 initiates one or more iterations (using steps 137, 138 and 139) during which it uses the file ID to look up the location of the requested file header or, alternatively, the file header of the directory file of the next directory 14 in the path in the index file, and then to use the retrieved directory file header to locate, in the secondary storage device, the appropriate block of the directory file of that next directory (step 137). During each iteration in which a directory file header and contents are retrieved, the file system manager 15 generates a cache request to enable the cache manager 20 to cache the retrieved directory file header in the file header entry list 23 below the directory entry, and to cache the block of the directory file in the directory file contents field 47 in a new directory entry 25 in the directory entry list 22 (step 138). These operations are described below in connection with FIGS. 4B-1 through 4B-2, with the above-described caveat that step 235 (FIG. 4B-2) is omitted when caching directory file headers.

When the iterations reach the last directory 14 in the path, in the retrieval step 137, the file system manager 15 uses the file ID of the file from that directory 14 to locate the requested processor file header, and in step 138 caches the file header in the file header entry list 23. In responding to a control request, it may also be useful to prefetch the file contents. The file system manager 15 ceases the iterations at this point (step 140), and transfers the information in the retrieved file header to the application 10 (step 140).

Access Request

In response to the receipt of an access request to, for example, read a particular block of a processor file 12 (step 141), the file system manager 15 initially generates a cache request to determine whether the file system cache 16 contains the block of the processor file specified in the access request (step 142). If the cache manager 20 determines that the file block is in one of the file contents entries 27 in the cache store 21 (step 143), it transfers the data in the file contents entry's file block contents cache data field 72 to the file system manager 15, which, in turn, makes the data available to the application 10 (step 144). The operations performed by the cache manager 20 in connection with such a request are described below in connection with FIGS. 4A-5 and 4A-6.

However, if the cache manager 20 determines in step 143 that the block of the processor file 12 requested in the access request is not in the cache store 21, the file system manager 15 proceeds to add a file contents entry 27 for the block to the file contents entry list 24. To add a new file contents entry to the cache, there must be a file header entry 26 in the file header entry list 23 for the file containing the requested block. If no such file header entry is in the cache, the file system manager locates and caches the file header of the file (step 145). In this operation, the file system manager 15 follows the steps used to locate and cache a file header in response to a control request, which have been described above with reference to FIGS. 4-1 through 4-4.

Once the file system manager verifies that the appropriate file header entry is in the cache, (and caches the file header if not), the file system manager 15 uses the file block information specified by the access request to locate the requested block of the processor file 12 in secondary storage and make it available to the application 10 (steps 146 and 147). In addition, the file system manager 15 enables the cache manager 20 to cache the block of the processor file 12 in a file contents entry 26 in the cache store 21 (step 148) below the newly created file header entry, as described below in connection with FIGS. 4B-1 and 4B-2.

Cache Retrieval Operations

With this background, a detailed description of the operations performed by the cache manager 20 in connection with cache store 21 will be described in connection with FIGS. 4A-1 through 4C. FIGS. 4A-1 through 4A-6 depict the operations performed in connection with determining whether a directory file, file header of a processor file, or a block of a processor file 12 is cached in the cache store 21. FIGS. 4B-1 through 4B-5 depict the operations performed in connection with establishing a new directory entry 25, file header entry 26, and file contents entry 27 in the cache store 21. FIG. 4C depicts certain maintenance operations performed by the cache manager 20 to eliminate entries 25, 26 and 27 whose data fields 47, 52 and 72, respectively, have not been used for a predetermined length of time.

With reference to FIG. 4A-1, the cache manager 20 first receives a cache request from the file system manager 15 (step 150) and determines the nature of the cache request. If the cache manager 20 determines that the cache request is to receive a cached directory file of an identified directory (step 151), it sequences to step 152, in which it first determines whether the cache store 21 contains any directory entries 25 (step 152). If the cache manager 20 determines in step 152 that the cache store does not contain any directory entries 25, (this may happen, for example, if the computer has just been reset, and the caches are empty), it returns a cache miss response to the file system manager (step 153).

If, on the other hand, the cache manager 20 determines that the cache store 21 contains at least one directory entry 25, it begins a series of one or more iterations to determine if the directory list 22 includes a directory entry 25 which contains the cached directory file of the directory 14 identified in the cache request. The cache manager first sequences to step 154, in which it selects the first directory entry 25A in the directory entry list 22, that is, the directory entry identified by the directory list forward pointer 31 in cache header list 30. The cache manager then determines whether the selected directory entry 25 is related to the directory identified in the cache request (step 155). In the first iteration, the cache manager 20 makes this determination in connection with the first directory entry 25A, but in subsequent iterations, it steps down the directory entry list 22 and it thus makes the determination in connection with other directory entries 25 in the directory entry list 22. (Alternatively, the cache manager may establish a hash table mapping the symbolic directory names in the cache to the location of the corresponding directory entry 25 in the directory entry list 22, in which case the loop 154, 155, 164, 165, 166 described below could be replaced with a hash into the table, and a check of the indicated directory entry 25. Also, a similar hash table technique could be used to access the file content entries which contain the blocks within a file, once the required file has been located).

If the selected directory entry 25 is the parent of the directory identified in the cache request, the entry's directory file contents field 47 may contain a cached copy of one or more blocks of the directory file of the directory 14, and the directory file ID field 46 contains the file ID of the directory file for the directory identified in the cache request. If the cache manager 20 determines in step 155 that the selected directory entry 25 is the parent of the directory identified in the cache request, it returns the directory file ID, and the directory file blocks from the entry's directory file contents field 47 to the file system manager 15 (step 156).

The cache manager 20 then proceeds to perform a series of operations to establish the directory entry 25, any file header entries 26 in a file header sequence in the file header entry list 23 associated therewith, and any file contents entries 27 in the file contents entry list 24 associated with those file header entries 26, as being the most recently used entries 25, 26 and 27, respectively. These operations establish a "least recently used" hierarchy among the entries 25, 26 and 27 so that when, as described below in connection with FIGS. 4B-1 through 4B-5, a new entry is required in response to a cache request from the file system manager to cache directory, file header, or file block information and the corresponding unused entry list is empty. It will be appreciated that, if the selected directory entry 25 is already at the head of the directory entry list 22, these operations are not required.

In the embodiment of the cache store depicted in FIG. 2, the "least recently used" hierarchy is established by manipulating the cache header list 30, the directory entries 25 in the directory entry list 22, the file header entries 26 in the file header entry list 23 and the file entries 27 in the file contents entry list 24, to move the selected directory entry 25 and associated file header entries 26 and file entries 27 to the heads of their respective entry lists 22, 23 and 24. With respect to the directory entry list 22, the cache manager 20 performs step 160, in which it links the selected directory entry 25 between the cache header list 30 and the current head directory entry 25 to insert the selected directory entry as the new head entry, and links the directory entries 25 that formerly preceded and succeeded the selected directory entry 25 to reestablish the continuity of the directory list 22.

More specifically, if the selected directory entry 25 is identified by reference numeral 25($i$), in step 160 the cache manager 20 first links the selected directory entry 25($i$) to the head of the directory entry list 22. In this operation, it saves the data in the directory entry forward and backward pointer fields 43 and 44 of the selected directory entry 25($i$) to a temporary store. The cache manager then (1) copies the data in the directory list forward pointer field 31 to the directory entry forward pointer field 43 of the selected directory entry 25($i$), so that the forward pointer of the selected directory entry 25($i$) will point to the current head directory entry 25A, (2) copies the data in the backward pointer field 44 in the current head directory entry 25A to the directory entry backward pointer field 44 of the selected directory entry 25($i$), and (3) copies the data in the directory entry forward pointer field of the directory entry 25($i-1$) which preceded the selected directory entry to the directory list forward pointer 31 so that the pointer 31 points to the selected directory entry 25($i$). At this point, the selected directory entry 25($i$) is linked as the new head of the directory entry list 25.

The cache manager 20 then links the directory entries 25($i-1$) and 25($i+1$), using the previously saved data from the directory entry forward and backward pointer fields 43 and 44 of the selected directory entry 25($i$). In this operation, the cache manager 20 (1) copies the saved data from the selected directory entry's directory entry forward pointer field 43 to the directory entry forward pointer field 43 of the preceding directory entry 25($i-1$), enabling the forward pointer 43 of that directory entry to point to the succeeding directory entry 25($i+1$), and (2) copies the saved data from the selected directory entry's directory entry backward pointer field 44 to the directory entry backward pointer of the succeeding directory entry 25($i+1$), enabling the backward pointer 44 of that directory entry to point to the preceding directory entry 25($i-1$). At this point, the preceding directory entry 25($i-1$) and succeeding directory entry 25($i+1$) are linked together, thereby completing step 160.

As noted above, if the selected directory entry 25($i$) is already at the head of the directory entry list 22, the cache manager 20 will not have to perform step 160. Further, if the selected directory entry 25($i$) is at the tail of the directory entry list 22, pointed to by directory list backward pointer 32, the cache manager 20 uses that pointer 32 instead of the directory entry backward pointer 44 of the succeeding directory entry in step 160.

Following step 160, the cache manager 20 sequences to steps 161 and 162, during which it performs operations similar to those described above to move the sequence of file header entries 26 (step 161) and sequence of file contents entries 27 (step 162) associated with the selected directory entry 25 to the heads of the file header entry list 23 and file contents entry list 24, respectively. To locate the beginning of the file header entry sequence, the cache manager 20 uses the data in the file header entry pointer field 45 from the selected directory entry 25(i), which is at this point at the head of the directory entry list 22. The cache manager 20 locates the end of the file header entry sequence by stepping down the file header entry list 23, iteratively using the data in the file header entry forward pointer fields 53 to locate each subsequent file header entry 26 in the list 23 and testing the data in the directory entry pointer field 55 to determine whether it points to the selected directory entry 25(i). (In another embodiment, a bit in each file header entry would be maintained to indicate whether the file header entry is the last file header entry for the directory, and similarly, a bit would be maintained in the file contents entries with respect to files. When a file header entry or file contents entry is moved to the beginning of the respective lists, this bit is cleared and the bit in the next previous entry is set.) This continues until the information in the directory entry pointer field 55 points to a directory entry 25 that is not the selected directory entry 25(i), which is the first file header entry 26 after the sequence associated with the selected directory entry. The cache manager 20 then links the sequence at the beginning of the file header entry list 23, using procedures similar to those described above in connection with step 160. The cache manager 20 then performs similar operations, during processing of step 162, to move the sequence of file contents entries 27 associated with the selected directory entry 25(i) to the head of the file contents entry list 24.

Returning to step 155, if the cache manager 20 determines that the selected directory entry 25 is not associated with the directory identified in the cache request, it sequences to a series of steps 164 through 166 to initiate another iteration. In step 164 (FIG. 4A-2) the cache manager 20 first determines whether the directory entry list 22 contains any additional directory entries 25. In this operation, the cache manager 20 determines whether the directory entry forward pointer 43 of the selected directory entry 25 points to the directory list backward pointer 32. If it does, the selected directory entry is the last directory entry 25 in the directory entry list 22, and so it cannot perform any further iterations. Furthermore, the cache manager 20 has sequenced through the directory entry list without finding a directory entry 25 associated with the directory identified in the cache request. In response, the cache manager 20 returns a cache miss indication to the file system manager 15 (step 165). On the other hand, if the cache manager determines, in step 164, that the directory entry list 22 contains additional directory entries 25, it selects the next directory entry 25, that is, the directory entry 25 identified by the directory entry forward pointer 43 of the current selected directory entry 25, as the selected directory entry 25 for the next iteration, and returns to step 155.

Returning to step 151 (FIG. 4A-1), if the cache manager 20 determines that the cache request from the file system manager 15 is not requesting a directory 14, it sequences to step 170 (FIG. 4A-3) in which it determines whether the cache request is requesting retrieval of a file header of a specified processor file. If so, it sequences through a series of steps 171 through 177 and 180 through 186, which are similar to steps 152 and 160 through 166 described above, to perform one or more iterations to determine whether the file header entry list 23 contains a file header entry 26 associated with the identified processor file 12. If the cache manager 20 finds no such file header entry 26, which may be the case either because it determines that the file header entry list 23 has no file header entries 26 (step 172) or because, after stepping down the file header entry list 23 (or hashing the symbolic file name into a suitable hash table), it determines that no file header entry 23 is associated with the requested processor file (step 184), the iterations cease and the cache manager 20 returns a cache miss to the file system manager 15 (steps 172 and 185, respectively).

On the other hand, if the cache manager is able to locate a file header entry 26 in the file header entry list 23 associated with the requested processor file 12 (step 174), it returns the data in the entry's file header cache data field 52 (step 175), sets the entry's used flag to mark the entry as recently used (step 176), and proceeds to perform a series of steps to (1) move the directory entry 25 associated with the file header entry 26, the file header entries 26 associated with the directory entry 25 and the file contents entries 27 associated with the directory entry 25 to the heads of the respective lists 22, 23 and 24 (steps 177 and 180 through 182), and (2) move the selected file header entry and the file contents entries associated with the selected file header entry to the head of the respective lists 23 and 24. The cache manager 20 locates the directory entry 25 associated with the file header entry 26 by use of the data in the directory entry pointer field 55 in the file header entry 26. After locating the directory entry 25, the cache manager 20 performs steps 180 through 182, which are substantially identical to steps 160 through 162 as described above, to move the associated entries and groups of entries 25, 26 and 27 to the heads of their respective lists. Finally, to complete the operations in response to the cache request, the cache manager moves the selected file header entry to the head of the file header entry list, and moves the file contents entries pointed to by the selected file header entry to the head of the file contents entry list (step 183). The selected file header entry is moved to the head of the file header entry list by operations substantially similar to the operations of step 160 which move a single directory entry to the head of the directory entry list. Furthermore, the file contents entries pointed to by the selected file header entry are moved to the head of the file contents entry list by operations substantially similar to the operations of step 161 which move a sequence of file header entries which are pointed to by a directory entry to the head of the file header entry list.

Returning to step 170 (FIG. 4A-3), if the cache manager 20 determines that the cache request from the file system manager 15 is not requesting retrieval of a file header, it sequences to step 190 (FIG. 4A-5) to determine whether the cache request is requesting a specified block of a processor file 12. If a cache request is requesting a specified block of a processor file 12, the block may be cached in a file contents entry 27 in the file contents entry list 24. If the cache manager 20 determines that cache request does not request retrieval of a specified block of a processor file it sequences to step 191, in which it performs other operations, such as those described below in connection with FIGS. 4B-1 through 4B-5, depending on the nature of the cache request.

On the other hand, if the cache manager 20 determines, in step 190, that the cache request relates to a specified block of a processor file 12, it steps through a sequence comprising steps 192 through 197 and 200 through 206 to process the request. These steps are substantially similar to steps 171 through 175, 177, and 180 through 186 that the cache manager 20 performs in connection with a cache request requesting a file header 26 as described above. In the present sequence, the cache manager 20 performs one or more iterations to determine whether the file contents entry list 24 contains a file contents entry 27 associated with the identified processor file 12. If the cache manager 20 finds no such file contents entry 27, which may be the case either because it determines that the file contents entry list 24 has no file contents entries 27 (step 192) or because, after stepping down the file contents entry list 24 (or hashing the symbolic file name into a suitable hash table), it determines that no file contents entry 27 is associated with the requested block of the processor file (step 204), the iterations cease and the cache manager 20 returns a cache miss to the file system manager 15 (steps 193 and 205, respectively).

On the other hand, if the cache manager is able to locate a file contents entry 27 in the file contents entry list 24 associated with the requested processor file 12 (step 195), it returns the data in the entry's file block contents cache data field 72 (step 196) and proceeds to perform a series of steps to (1) update the used flag of the appropriate file header entry, (2) move the directory entry 25, the file header entries 26, and the file contents entries 27 associated with the directory entry 25 to the heads of the respective lists 22, 23 and 24, (3) move the file header entry associated with the selected file contents entry to the head of the file header entry list, and (4) move the selected file contents entry to the head of the file contents entry list (steps 201 through 203). The cache manager 20 first locates the directory entry 25 associated with the file contents entry 27 by first locating the file header entry 26 associated with the file contents entry 27 (step 197). In this operation, the cache manager 20 uses the data in the file contents entry's file header entry pointer field 75. After locating the file header entry 26, the cache manager 20 sets the used flag of the identified file header entry, to indicate that the file has recently been used (step 200). Next, the cache manager 20 uses the directory entry pointer field 55 in the file header entry 26 to locate the directory entry 25 (step 201). After locating the directory entry 25, the cache manager 20 performs step 202, which is substantially identical to steps 180 through 183 described above, to move the entries 25, 26 and 27, to the heads of their respective lists. Finally, to complete the operations in response to the cache request, the cache manager 20 moves the selected file contents entry to the head of the file contents entry list, by operations substantially similar to those used in step 160 to move a directory entry to the head of the directory entry list.

Cache Entry Creation

If the cache request from the file system manager 15 does not request either a directory, file header or specified block of a processor file 12, it may, as noted above, relate to creation of a new directory entry 25, file header entry 26 or file contents entry 27. (For example, when a cache request ends in a "miss" the eventual result will be a request for creation of an entry of an appropriate type.) The operations performed by the cache manager 20 in response to such a cache request are depicted in FIGS. 4B-1 through 4B-5. Initially, the cache manager 20 determines whether the cache request relates to creation of a new entry 25, 26 or 27 (step 220, FIG. 4B-1). If not, the cache manager sequences to step 237 to perform another cache operation required by the cache request (e.g., a status check requesting the recent cache hit rate). However, if the cache request relates to the creation of a new entry, the cache manager 20 sequences to step 221 to determine whether the appropriate unused entries list includes any unused entries which may be used for the new entry. If an appropriate unused entry is available, the cache manager 20 proceeds to a sequence, beginning with step 222, that unlinks the unused entry from the unused entry list, links it as a new directory entry 25, file header entry 26 or file contents entry 27, to the head of the corresponding list 22, 23, or 24 and fills in the fields of the new entry. On the other hand, if the cache manager 20 determines that the appropriate unused entry list does not have any unused entries, it locates the least recently used entry of the same type, eliminates that entry and uses it, in the same manner as an unused entry, to create a new entry.

More specifically, upon receipt of a cache request to create a new directory entry 25, file header entry 26 or file contents entry 27 (step 220), the cache manager 20 determines whether the appropriate unused entry list includes any unused entries (step 221). If so, the cache manager identifies an unused entry and unlinks it from the unused entry list (step 222) for use in processing the cache request. If, for example, the cache manager uses the unused entry at the head of the unused entry list in processing the cache request, it modifies the appropriate unused list forward pointer to point to the second unused entry in the unused entry list, and modifies the backward pointer field of the second unused entry to point to the appropriate unused list forward pointer in the cache header list 30. It thereafter uses the unused entry formerly pointed to by the appropriate unused list forward pointer in processing the cache request. Similarly, if the cache manager 20 uses the unused entry at the end of the unused entry list, it modifies the appropriate unused list backward pointer to point to the second to last unused entry in the unused entry list, and modifies the unused list forward pointer of the second to last unused entry to point to the appropriate unused list backward pointer in the cache header list 30.

After obtaining an unused entry to create the new directory entry 25, file header entry 26 or file contents entry 27, the cache manager 20 proceeds to step 223, in which it determines whether the cache request requests creation of a new directory entry 25 (step 223). If so, it sequences to step 224 to link the new directory entry 25 at the head of the directory entry list 22 (step 224). In that operation, it (1) updates the data in the directory list forward pointer field 31 to point to the new directory entry 25, (2) updates the data in the forward and backward pointer fields 43 and 44 of the new directory entry 25 to point to the second directory entry 25, which was formerly head of the list 22, and the directory list forward pointer 31, respectively, and (3) updates the data in the directory entry backward pointer field 44 of the second directory entry 25 to point to the new directory entry 25.

After linking the new directory entry 25 at the head of the directory entry list 22, the cache manager 20 proceeds to load the data in the remaining fields of the new directory entry 25. At this point, the cache manager 20 only loads the appropriate block or blocks of the directory file, which it received along with the cache request, into the directory file contents field 47 (step 226).

Returning to step 223, if the cache manager 20 determines that the cache request does not request creation of a new directory entry 25, it sequences to step 230 to determine whether the cache request requests creation of a new file header entry 26. If so, it sequences to step 231, in which it first identifies a directory entry 25 associated with the directory 14 that includes the file header of the processor file 12 (step 231). Such a directory entry 25 may be present in the directory entry list 22, or it may need to be brought into the cache (i.e., treated as a cache miss). Thereafter, the cache manager 20 uses the unused entry retrieved in step 222 to create the new file header entry, links the new file header entry 26 at the head of the file header sequence associated with the directory, and moves the directory entry, associated file header sequence and associated file contents entry sequence to the heads of the respective lists 22, 23 and 24 (steps 232 through 235) by updating the forward and backward pointers as described above. In addition, the cache manager 20 stores the file header that was supplied with the request in the file header cache data field 52 of the newly created entry, and sets the used flag 62 of the newly created entry (step 236).

Figures 1, 4E:
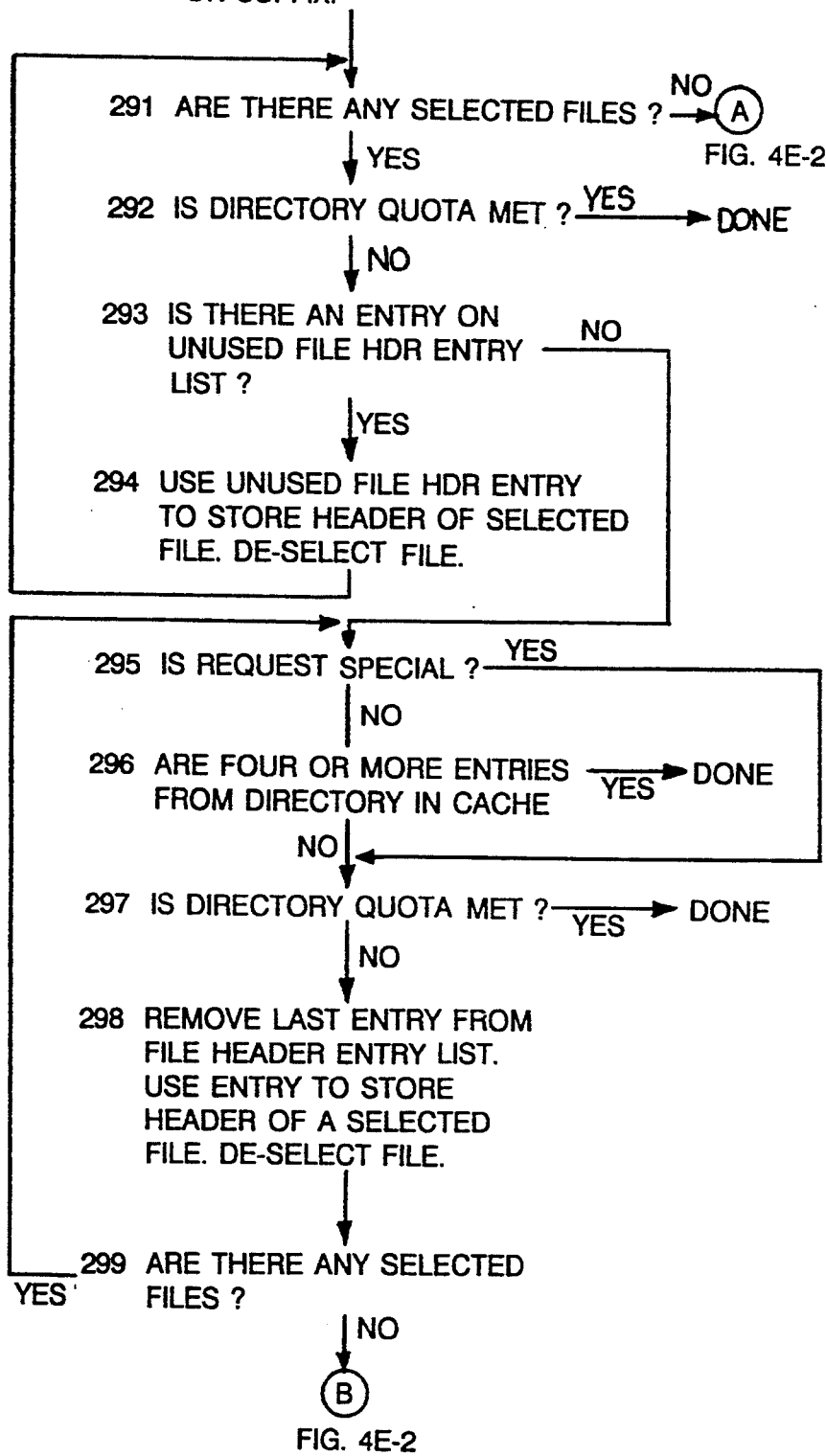
Figures 2, 4E:
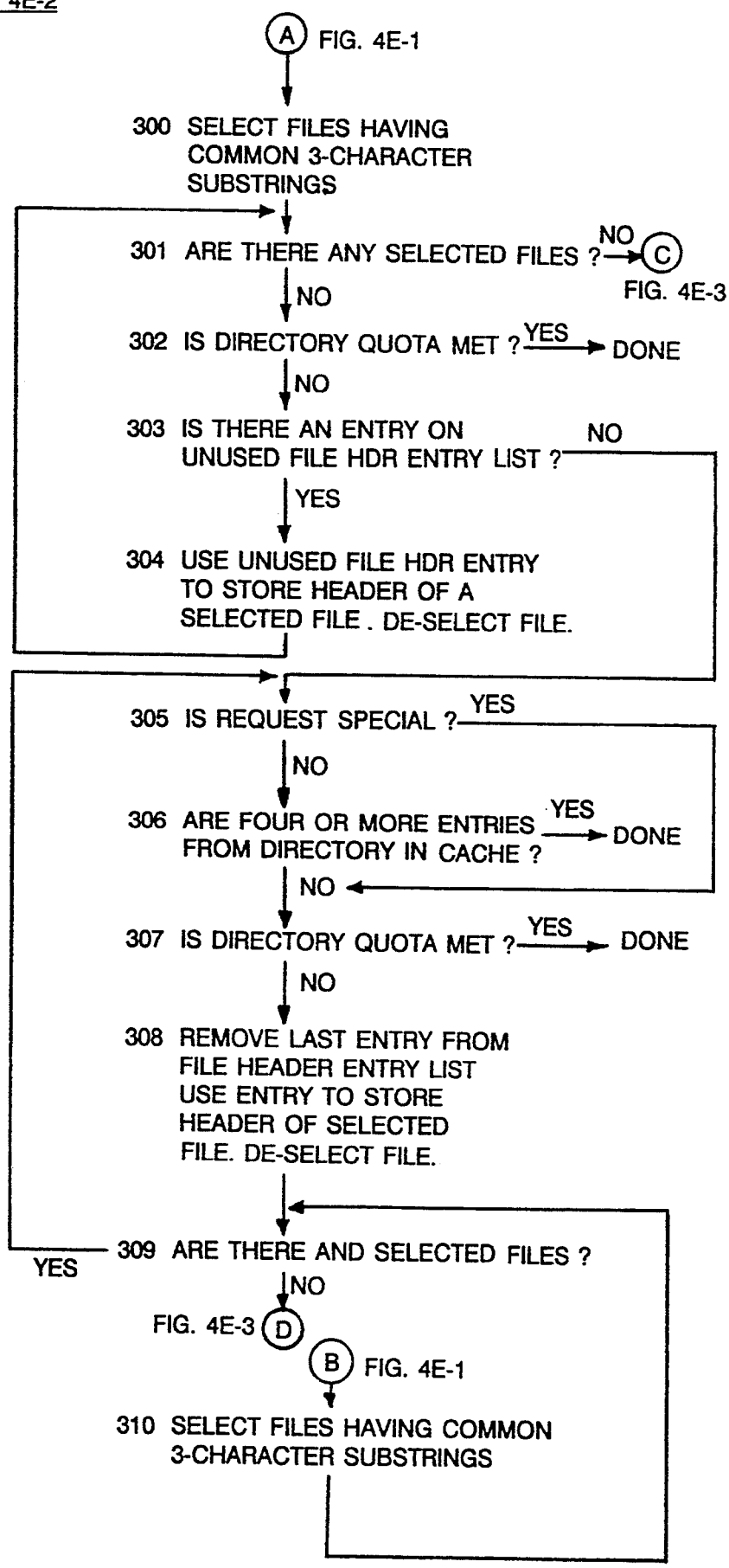
Figures 3, 4E:
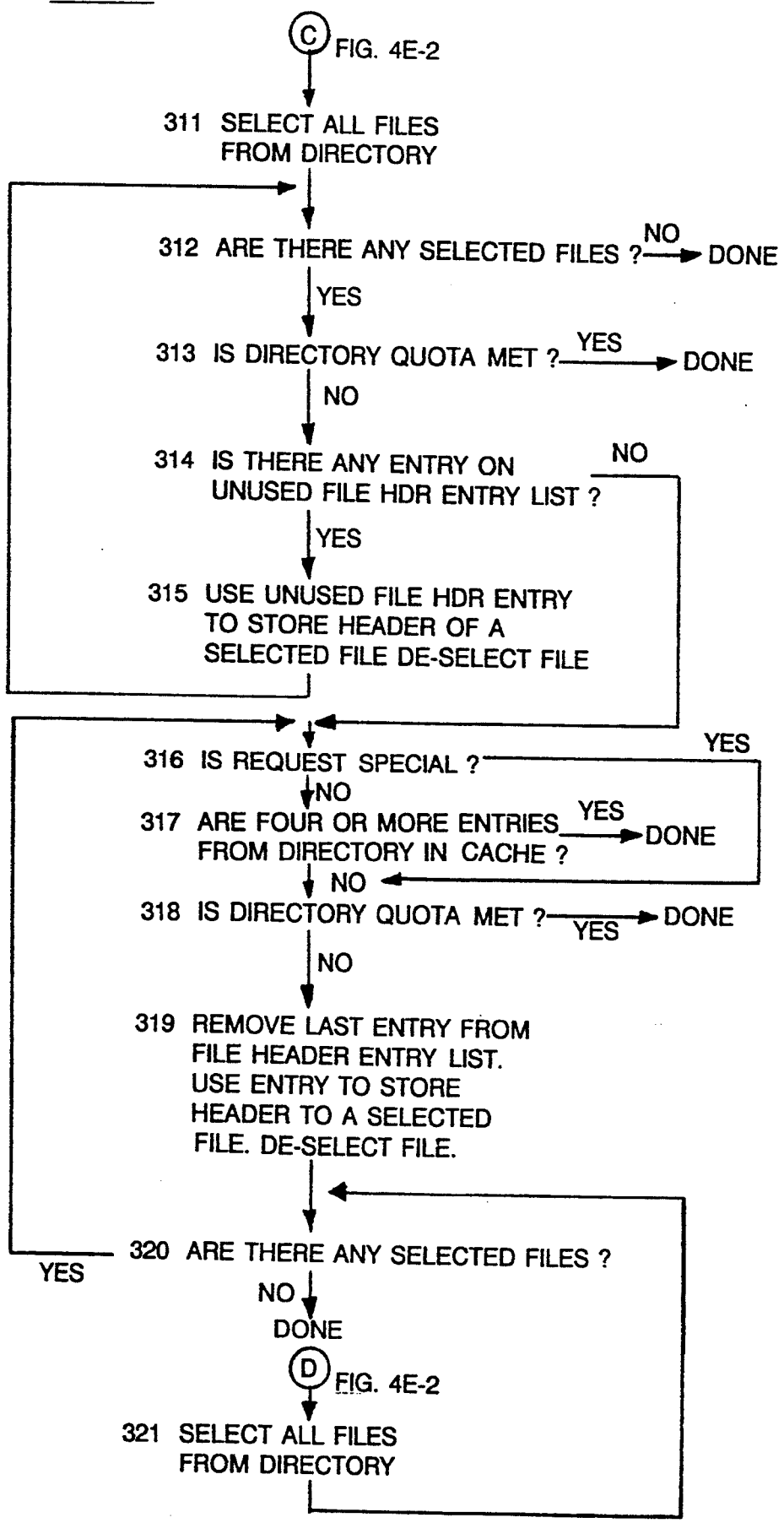

If, in step 230, the cache manager 20 determines that the cache request is not directed to creation of a new file header entry 26, it sequences to step 239, FIG. 4B-3 to create a new file contents entry 27, in which it first identifies a file header entry 26 (step 239) and then a directory entry 25 (step 240) associated with the directory 14 that includes the processor file 12. Such a directory entry 25 and a file header entry 26 may be present in the directory entry list 22, or they may need to be brought into the cache on a read or write request. (Note that the directory entry and the file header entry may be locked down as long as the file is kept open, as explained below.) Thereafter, the cache manager 20 uses the unused entry retrieved in step 222 to create the new file contents entry 27, links the new file contents entry 27 at the head of the file contents entry sequence associated with the processor file's file header and moves the directory entry, associated file header sequence and associated file entry sequence to the heads of the respective lists 22, 23 and 24 (steps 241 through 244) by updating the forward and backward pointers as described above. In addition, the cache manager 20 moves the file header entry associated with the new file contents entry to the head of the file header entry list, and sets its used flag (step 245), thus indicating that the file associated with the file header entry has been recently used. The used bit on the file header may be set on a read or write operation as well as on an open or close operation. This enables the proper aging and hence removal of the appropriate file contents and file headers by being sensitive to activity relating to access requests as well as control requests.

Finally, the cache manager 20 stores the file block that was supplied with the request in the file block contents cache data field 72 of the newly created entry (step 246).

Returning to step 221 (FIG. 4B-1), if the cache manager 20 determines that the appropriate unused entry list is empty, it sequences to step 247 (FIG. 4B-5) to identify the least recently used directory entry 25, file header entry 26 or file contents entry 27, which may be used in processing the cache request. In that operation, since the lists 22, 23 and 24 effectively form least recently used lists, the cache manager 20 uses either the directory list backward pointer 32, the file header list backward pointer 34, or the file contents list backward pointer 36 in the cache header list 30 to identify the last entry in the appropriate list.

It will be appreciated that, because of the cache list manipulations described above, the last entry in the directory list 22 indicates the directory that has least recently been used; that is, the directory that least recently has been manipulated or has had a file header or file block in it manipulated. Also, the last entry in the file header entry list indicates the file header of the least recently used directory that has least recently been used; that is, of the file headers of files in the least recently used directory, it is the file header that has been least recently manipulated or has had a block of its related file manipulated. Finally, the last entry in the file contents entry list indicates the least recently used file block of the least recently used file of the least recently used directory; that is, of the blocks of the least recently used file of the least recently used directory, it is the least recently used block.

Thus, if the cache manager 20 seeks to obtain a new directory entry (step 247), it locates the least recently used directory entry by using the directory entry list backward pointer 32 to identify the last directory entry 25 in the directory list 22 (step 248). The cache manager 20 then unlinks the last directory entry 25 for use in creating the new entry 25, as described above in connection with FIGS. 4B-1 through 4B-4, updating the various pointers in the other entries 25, as necessary (step 251). In addition, because the last directory entry has been removed from the cache, the file header and file contents entries from that directory must also be removed. Therefore, the cache manager 20 uses the last directory entry's file header entry pointer 45 to identify the sequence of file header entries 26 in the file header entry list 23 associated with the last directory entry 25, and unlinks this sequence of file header entries from the file header entry list and moves the sequence to the unused file header entry list (step 250). Furthermore, the cache manager 20 identifies the sequences of file contents entries 27 associated with each of the removed file header entries 26 (by using the file contents entry pointers 56), and moves the sequences to the unused file contents entry list (step 250). The cache manager then returns to step 223 (FIG. 4B-1) to process the cache request. It is important that this be done as infrequently as possible. The implementation would choose a quota for directory entries in the cache so that directory entries would stay in the list as long as possible. Note that aging will rid the cache of very old file headers and file contents. The removal of a directory entry through aging may be done when there are no more file headers associated with a particular directory entry. As a result, the removal of a directory through aging would not be a very expensive operation.

On the other hand, if the cache manager 20 seeks to obtain a new file header entry (step 252), it locates the least recently used file header entry by using the file header entry list backward pointer 34 to identify the last file header entry 26 in the file header entry list 23 (step 253). The cache manager 20 then unlinks the last file header entry 26 for use in creating the new entry 26, as described above in connection with FIGS. 4B-1 through 4B-4, updating the various pointers in the other entries 26, as necessary (step 255). In addition, because the last file header entry has been removed from the cache, the file contents entries from that file must also be removed. Therefore, the cache manager 20 uses the last file header entry's file contents entry pointer 56 to identify the sequence of file contents entries 27 in the file contents entry list 24 associated with the last file header entry 26, and unlinks this sequence of file contents entries from the file contents entry list and moves the sequence to the unused file contents entry list (step 254). The cache manager then returns to step 223 (FIG. 4B-1) to process the cache request.

Finally, if the cache manager 20 seeks to obtain a new file contents entry, it locates the least recently used file contents entry by using the file contents entry list backward pointer 36 to identify the last file contents entry 27 in the file contents entry list 24 (step 256). The cache manager 20 then unlinks the last file contents entry 27 for use in creating the new entry 27, as described above in connection with FIGS. 4B-1 through 4B-4, updating the various pointers in the other entries 26, as necessary (step 257).

Aging

Since, as described above, the cache manager 20 effectively maintains the lists 22, 23 and 24 as least-recently-used lists based on the directory entry 25, and the sequence of file header entries 26 and file entries 27 associated therewith, the sequences of file header entries 26 and file entries 27 associated with directory entries recently moved to the head of the directory entry list 22 may have file header entries 26 and file entries 27 that have not been used for a lengthy period of time. The cache manager periodically performs an aging operation (for example, on a predetermined time schedule, or once every certain number of operations), as depicted in FIG. 4C, to identify those entries which have not been used since the last aging operation, remove them from the respective lists 22, 23 and 24 and link them as unused entries in the appropriate unused entry lists.

The cache manager performs a series of iterations which effectively walks through the file header entry list 23 by iteratively examining their used flags. More specifically, with reference to FIG. 4C, the cache manager 20 selects the file header list forward pointer 33 and uses it to identify the first file header entry 26 in the file header entry list (step 260). The cache manager 20 then checks the used flag 62 of the first file header entry to determine whether the entry was used in the period between this aging operation and the one immediately before (i.e., if it was used during a predetermined period prior to the present time (step 262). If the entry has not been used (i.e., if the entry's used flag is clear) the cache manager unlinks the entry, as described above, and links it to the unused file header entry list (not shown) as a new unused entry (step 263). In this operation, the cache manager may link the unused file header entry at the head of the unused file header entry list, as identified by the the unused file header list forward pointer field, or at the tail of the unused file header entry list as identified by the the unused file header list backward pointer.

Following step 263, at step 264 any file contents entries 27 below the removed file header entry (as indicated by the file contents entry pointer 56) are removed from the file contents list 24 and placed in the unused file contents entry list (not shown), for example, at the head or tail of the unused file contents entry list.

After step 264, the cache manager determines whether any other file header entries point to the directory entry pointed to by the directory entry pointer 255 of the removed file header entry (step 265). In this operation, the cache manager uses the removed file header entry's forward pointer 53 to examine the file header entry which previously followed the removed file header entry, and uses the removed file header entry's backward pointer 54 to examine the file header entry which previously preceded the removed file header entry. If neither the previously following or previously preceding file header entries point to the same directory entry as the removed file header entry, then no remaining file header entries point to the directory entry, in which case (step 266) the directory entry is removed from the directory entry list, and the cache manager sequences to step 268. Otherwise, the directory entry is not removed, and the cache manager sequences directly to step 268. In a variation of this scheme, a bit could be provided to indicate "this is the last file header in the directory"; this makes it easier to determine that the directory entry is to be removed.

If, at step 262, the cache manager determines that the current file header entry's used flag is set (indicating that the file header entry or a related file contents entry was used after the most recent aging operation), then the current file header's used flag is cleared (step 267).

Following step 267, the cache manager 20 determines whether there are any additional entries in the file header entry list 22 (step 268). If so, the cache manager 20 selects the next file header entry (step 269) and returns to step 262. The cache manager 20 performs steps 262 through 269 in connection with the file header entries 26 until it determines, in step 264, that there are no further file header entries 25 in the list 22, at which point the aging operation is completed. Note that this activity of aging file headers is independent of the directories that the file headers are in.

Quotas

It will be appreciated that maintaining the lists, particularly the directory entry list 22 and file header entry list 23, as described above, that is, with links both within the respective lists 22 and 23 and with links between the lists, provides advantages, both in time required to use the various entries and in selection of an entry to be replaced when a new entry needs to be established. In particular, since application programs 10 normally operate on processor files 12 in a localized manner, that is, in one directory 14 or in a directory 14 and its relative subdirectories, maintaining the association between a directory entry 25 in the directory list 22 and the sequence of file header entry list 23 and file contents entry list 24, respectively, enhances the likelihood that a requested file header entry 26 and/or file contents entry 27 will be in the cache store 21. This results, in part, from the association maintained between the entries and sequences in the lists for replacement purposes.

It will be further appreciated that, by maintaining an association between the processor file information (i.e., file headers and file blocks) and the directories containing those processor files, the invention may enforce a quota on the number of file headers and/or file blocks from a given directory that are entered into the cache. Thus, the computer system (e.g., a file server) may prevent the resources of the cache from being monopolized by one directory.

As an example, consider a user command that retrieves information from every file header in a particular directory, such as the VAX/VMS operating system command "dir/date *.*" which retrieves the creation date information from all of the file headers in the current directory. If there is no quota on the number of file headers that may be placed in the cache from a particular directory, the above command causes every file header from the indicated directory to be placed in the cache. To make room for the new file headers, some or all of the file headers from other directories may be removed from the cache. This can significantly reduce the cache's hit rate; if subsequent cache requests relate to the removed file headers, the removed headers must be re-retrieved from secondary storage.

To avoid the above scenario, the cache architecture described above is further used to establish a quota on the number of file headers from any given directory that may be placed in the cache. This is done by performing a quota determination before new entries are created, i.e., between steps 220 and 221 of FIG. 4B-1.

Referring to FIG. 4D-1, after step 220 of FIG. 4B-1, if the cache manager determines that the cache request requests creation of a new entry, the cache manager then determines whether the cache request requests creation of a new file header entry 26 (step 270). If so, the cache manager identifies the directory entry 25 for the directory that contains the file whose file header will be stored in the new file header entry (step 271). The cache manager then counts the number of file header entries for files from that directory that are already present in the cache (step 272). This may be done, for example, by using the identified directory entry's file header entry pointer 45 to identify the first file header entry 26 associated with the directory entry, and sequentially stepping through sequential file header entries in the file header entry list 23 by using the file header entry forward pointers 53. At each entry, the cache manager checks whether the directory entry pointer 55 of the entry indicates the identified directory; or if a bit is used to indicate the last file header in this directory, then the cache manager may simply look for this bit Quotas may be imposed unilaterally or only when needed. That is, we may impose a quota on the number of entries at a particular level of the cache independent of whether there are available entries in the unused entry list (unilateral imposition of quota) or the quota may be imposed only when there are no more entries available in the unused list (imposition of quota only when needed). Alternatively, if a counter is maintained to keep a count of the file headers in a directory (the counter may be held in the directory entry), then it is easier to manage the quota. The count may also be to know when the last file header in the directory has been reached by comparison of the count with the actual number stepped through iteratively while searching for a particular file header.

Once a count of the number of file header entries from the identified directory are in the cache, the cache manager determines whether this count is greater than or equal to the pre-set quota (step 273). If not, the cache manager returns to step 221 of FIG. 4B-1 to obtain a new entry (either from the unused file header entry list, or by removing the least recently used file header entry from the least recently used directory). However, if the directory is at its quota, the cache manager locates the file header entry 26 from the identified directory which appears last in the file header entry list, (the above counting operation will stop on this last entry, so its address should be readily available). The cache manager then moves this entry to the unused file header entry list (step 274), in the manner described above. Furthermore, the cache manager moves the list of file contents entries indicated by the removed file header entry to the unused file contents entry list, also in the manner described above. As a result of the above steps, an additional file header entry is added to the unused entry list, and the cache manager may sequence to step 247 (FIG. 4B-5) to use this extra unused entry to create the new file header entry. More simply, the new file header is simply placed directly into the available file header entry without requiring the two-step process described above. Also note that it is preferable to impose the quota only when no more unused entries are available in each level of the multi-level cache.

If, at step 270, the cache manager determines that the cache request does not request creation of a new file header entry, the cache manager then determines if the request requests creation of a new file contents entry 27 (step 275). If not, the quota determination is unnecessary, and the cache manager sequences to step 221 of FIG. 4B-1. However, if the request does request creation of a new file contents entry 27, the cache manager identifies the file header entry for the file that contains the block that will be stored in the new file contents entry (step 276). Next, the cache manager counts the number of file contents entries from that file which are already in the cache, by methods similar to those described above for step 272 (step 277). If (step 280) the count does not equal the quota, the cache manager sequences to step 221, FIG. 4B-1. However, if the count is greater than or equal to the quota, the cache manager then places a new entry on the unused file contents entry list by identifying the least recently used file contents entry from the same file, and moving this entry to the unused file contents entry list (step 281). More simply, a count could be kept of the number of blocks in the file header entry. Thereafter, the cache manager proceeds to use the extra unused entry to store the new file block, by sequencing to step 247 (FIG. 4B-5).

Prefetching

As described above in connection with FIGS. 4-1 through 4-5, the file system manager 15, in connection with a request from an application 10, normally retrieves the information from the directory system 13 related to the directories 14 and processor files 12 specifically identified in the request and other information from file headers. However, in a further refinement, the file system manager 15 may, immediately after generating a cache request to establish a directory entry 25 associated with a directory 14, fetch file headers associated with all of the files in the directory 14, including both processor files 12 and directory files defining relative subdirectories in the directory 14, and generate cache requests to enable the cache manager 20 to establish file header entries 26 for each. Since, as noted above, an application program 10 generally operates on processor files in a localized manner, the pre-fetching of file headers of processor files 12 will enhance the likelihood that information that the file system manager 15 may use to locate a requested processor file 12 will be in the cache store 21. Similarly, the pre-fetching of file headers of directory files of the subdirectories will reduce the amount of time required by the file system manager 15 to locate either a subdirectory or a processor file therein if requested by a request from an application 10, since the file system manager 15 may retrieve, from the file system cache 16, a directory file's file header from the file system cache 16 and use it to locate other information in the directory if necessary to satisfy the request.

Processor files tend to be named in a contextual fashion, that is, files which are accessed together often have similar or identical prefixes or suffixes. Therefore, one prefetching scheme is based on the symbolic file names. For example, when information about a file is retrieved from secondary storage, the cache manager searches for other files having symbolic names with the same prefixes or suffixes as the name of the retrieved file. This concept is best illustrated by two examples, which follow.

Pascal language source files often use the extension "pas", and similarly, C language source files often use the extension "c". Furthermore, when these source files are compiled, the output of the compile operation (an object code file) also often has a common suffix, such as "obj". Thus, when compiling a multi-module pascal program, a group of files named, for example, module1.pas, module2.pas, and module3.pas are sequentially retrieved and compiled by the Pascal compiler. The result is a set of files named, for example, module1.obj, module2.obj, and module3.obj. These files are then sequentially retrieved and linked by the Pascal linker. The result is a ".exe" file. Prefetching the headers of all of the .pas files when the first such file is retrieved by the compiler can substantially increase the speed of the compile operation. Similarly, prefetching the headers of all of the .obj files when the first such file is retrieved by the linker can increase the speed of the linking operation.

In another example, application programs often use data files. The names of these data files often use the same prefix as the file which stores the executable code for the application program. For example, an application program whose executable code is stored in a file named "foo.exe" may retrieve initialization parameters from a data file named "foo.dat". When the user runs the application program "foo" (by accessing the executable code file foo.exe), the foo program immediately retrieves "foo.dat" to obtain its initialization parameters. By prefetching the header of foo.dat into the cache when foo.exe is retrieved, the time required for initialization of the foo application program can be decreased.

The above examples illustrate prefetching based on common prefixes or suffixes. However, more generally, prefetching can look for files having common substrings (e.g., substrings of three or more characters) in their symbolic file names. A strategy of this type may take advantage of other filenaming conventions, such as where the suffix of data files are related to the prefix of the application program's executable code file—for example, an application program named "foo" may store initialization parameters in a file named "init.foo".

One difficulty with prefetching is that the prefetched entries may never be used, and thus may needlessly consume cache space. The aging mechanism described above is the primary means by which such useless prefetched entries are removed from the cache. To speed the removal process, when a file header is prefetched, the used flag 62 of the file header's file header entry is not set. Therefore, prefetched entries will be removed during the next aging operation if they are not used.

Although the aging mechanism will remove useless prefetched entries, prefetching an excessive number of files into the cache may cause other, useful file headers to be removed from the cache to make room for the prefetched entries, and thus reduce the cache's overall hit rate. For this reason, the cache manager needs some mechanism to limit the number of entries that are prefetched into the cache.

Empirical evidence suggests that the median number of active files in a directory is approximately four. Therefore, one prefetching scheme limits the number of file headers that may be prefetched at one time to four. However, if unused file header entries are available on the unused file header entry list, additional prefetching is allowed until all of the unused entries are used.

If more file headers than the allowed number are candidates for prefetching, a randomly selected subset of the possible file headers are prefetched. An effective algorithm for selecting candidates for prefetching (such as an algorithm matching symbolic names as described above) can help to reduce the number of candidates for prefetching, and also increase the likelihood that the prefetched file headers will be used.

Notwithstanding the above paragraphs, there may be circumstances in which unlimited prefetching of any file headers in the same directory may be advantageous and in fact desirable. For example, during backup operations, all files in a directory are accessed at once, and thus the more file headers that are prefetched, the less time that is required for backup. To provide for such situations, the cache manager may have an override mode, which can be engaged by a special request type, in which the number of files that can be prefetched is unlimited, and any rules (such as "similar names") for selecting candidates for prefetching are disabled. In response to a special request (for example from a backup process), the cache manager will prefetch every file in the directory of the file specified by the request (limited, of course, by the quota for the directory).

Referring to FIGS. 4E-1 through 4E-4, prefetching is performed by the cache manager after a file header has been retrieved from secondary storage (i.e., after step 236, FIG. 4B-2). The cache manager first retrieves the directory file contents field from the directory entry under which the new file contents entry was placed, and selects any files which have symbolic file names with the same prefix or suffix as the symbolic file name of the retrieved file (step 291).

To prefetch the headers of the selected files, the cache manager then follows two loops. In the first loop (steps 291 through 294), the cache manager removes unused file header entries from the file header entry list and uses these entries to store the headers of the selected files (step 294). The removal may only be performed if the aging time period has expired. During each iteration of this loop, the cache manager checks if there are any entries in the unused file header entry list (step 293). If no entries remain on the unused entry list, the cache manager moves to the second loop.

In the second loop (steps 295 through 299), the cache manager removes entries from the end of the file header entry list (i.e., removes the least recently used file headers of the least recently used directory) and uses these entries to store the headers of selected files (step 298).

During the first loop, all of the entries used to store prefetched file headers are obtained from the unused entries list. Therefore, no old entries are lost from the cache as prefetched entries are added by the first loop.

For this reason, the cache manager terminates prefetching in the first loop only if it determines that the directory's quota has been reached (step 292).

The cache manager will also terminate prefetching in the second loop if it determines that the directory's quota has been reached (step 297). However, during the second loop, entries must be removed from the file header entry list to provide space to store prefetched file headers. Therefore, old entries are lost from the cache as the prefetched entries are added in the second loop. For this reason, the cache manager checks during each iteration if the request was "special" (step 295). If the cache manager determines that the request was not special, then it determines if four or more entries from the directory are already present in the cache (step 296). To minimize the number of old entries lost, the cache manager terminates prefetching in the second loop if it determines that four entries from the directory are already stored in the cache. Thus, at maximum, four entries will be removed from the file header entry list as a result of a non-special prefetch operation. (Note that the cache manager checks the number of file header entries from the current directory during each iteration of the second loop; therefore, if four entries from the directory are in the cache at the beginning of the second loop, no additional entries will be prefetched, and no old entries will be removed from the file header entry list that may be part of another directory).

Returning to step 295, if the request is special, then an unlimited number of entries may be prefetched into the cache. Therefore, if the request is special, then the cache manager sequences directly to step 297, and does not check how many entries from the directory are already in the cache.

During each iteration of the first and second loops, the cache manager checks if there are any selected files which have not been prefetched (steps 291 and 299). If few or no files were located in step 290, then the cache manager may run out of selected files before reaching the other termination conditions discussed above. For non-special requests, the cache manager may simply terminate prefetching under these conditions. However, as discussed above, empirical evidence suggests that, on average, several files are active in a directory. Therefore, rather than terminating prefetching, it may be advantageous for the cache manager to switch to a more liberal file selection scheme in an attempt to locate more files as candidates for prefetching.

The latter alternative is illustrated in the Figures. In particular, when the cache manager determines at step 291 or step 299 that there are no selected files, it sequences to step 300 or step 310, (FIG. 4E-2) respectively. In step 300 or step 310, the cache manager selects all files that were not previously selected and have symbolic file names which have three-character substrings in common with the symbolic file name of the retrieved file. After the appropriate files have been selected, the cache manager again follows two loops (steps 301 through 304, and steps 305 through 309), which are substantially similar to the two loops of FIG. 4E-1. The first loop removes entries from the unused file header entry list and uses them to store prefetched file headers (step 304)—it terminates prefetching only when the directory quota has been met (step 302); the second loop removes old entries from the file header entry list and uses them to store prefetched file headers (step 308)—it terminates if the directory quota is met (step 307) or (for non-special requests) if four entries from the current directory have been located (step 306). The first loop sequences into the second loop if the unused file header entry list becomes empty (step 303). Entries may be removed only after the aging interval has expired.

When the cache manager determines that there are no selected files in the first loop of FIG. 4E-1 (i.e., at step 291), it enters the first loop of FIG. 4E-2 (i.e., at step 300). However, when the cache manager determines that there are no selected files in the second loop of FIG. 4E-1 (i.e., at step 299), it enters the second loop of FIG. 4E-2 (i.e., at step 310).

The cache manager may run out of selected entries in first or second loops of FIG. 4E-2 as well (steps 301 and 309). In this case, the cache manager must revert to an even more liberal file selection policy, illustrated in FIG. 4E-3. Thus, when the cache manager determines at step 301 or step 309 that there are no selected files, it sequences to step 311 or step 321 (FIG. 4E-3), respectively. In step 311 or step 321, the cache manager selects all of the files from the directory that were not previously selected. After the files have been selected, the cache manager again follows two loops (steps 312 through 315, and steps 316 through 320), which are similar to the two loops of FIGS. 4E-1 and 4E-2. The first loop removes entries from the unused file header entry list and uses them to store prefetched file headers (step 315)—it terminates prefetching when the directory quota has been met (step 313); the second loop of FIG. 4E-3 removes old entries from the file header entry list and uses them to store prefetched file headers (step 319)—it terminates if the directory quota has been met (step 318), or for non-special requests, if four entries from the current directory have been located (step 317). The first loop sequences into the second loop if the unused file header entry list becomes empty (step 314).

Unlike the first loops of FIGS. 4E-1 and 4E-2, when the cache manager determines that there are no selected files in FIG. 4E-3 (steps 312 and 320), then, because all files of the directory were selected at the beginning of the loops, all files of the directory must have been prefetched. Thus, in FIG. 4E-3, under these circumstances the cache manager terminates prefetching.

OTHER EMBODIMENTS

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

For example, the directory file contents field 47 may be omitted from the directory entry 25, in which case the file contents entries 27 may be used to store the contents of directory files. In this embodiment, when the cache manager (as it services a file control request) locates a directory entry 25 in the directory entry list 22, it then uses the directory file ID stored in the directory entry 25 to search for a file contents entry 27 storing the requested block of the directory file. If the requested block is located, then the file ID of the requested processor file or directory file is retrieved from the block and used to retrieve further directory files or the file's contents.

Also, the above algorithms may be suitably modified so that file header entries are retained in the cache as long as their associated files are open, regardless of whether there are any file contents entries for the file remaining in the cache. This implementation avoids the costly operation of re-retrieving the file header when an access is made to a file whose file header has been removed from the cache (step 145, FIG. 4-5).

Furthermore, while the cache system 16 has been described as having lists 22, 23 and 24 which effectively include least-recently-used information (i.e., the positions of the entries 25, 26 and 27 are modified as described above whenever the entries are used), it will be appreciated that the cache manager may, instead, include least-recently-used information in the cache entries themselves so that the positions of the entries in the lists do not need to be modified. For example, the cache manager may maintain a time counter, and each of the entries may include an associated counter field (not shown) for storing values of the time counter. The counter value may be stored by a field in each entry or in separate linked lists, similar to the lists 22, 23 and 24, with links also to the associated entries 25, 26 and 27.

In this embodiment, the cache manager 20 places the current value of the counter into the counter field when it accesses the entries uses an entry in response to a cache request. When a directory entry must be removed from the directory list to make room for a new directory entry, the directory entry having the earliest value of the counter (the least-recently-used directory entry) is removed. When a file header entry must be removed, the group of file header entries below the least-recently-used directory entry are analyzed, and the least-recently-used file header entry under the least-recently-used directory entry is removed. Similarly, when a file contents entry must be removed, the least-recently-used file contents entry under the least-recently-used file header entry under the least recently-used directory is removed.

It will be appreciated that maintaining least-recently-used information, either by means of fields therefore in the entries 25, 26 and 27, or by means of separate linked lists, may simplify processing activities by the cache manager 20 in response to a cache request, since it does not have to move used and associated entries 25, 26 and 27 to the heads of the respective lists 22, 23 and 24. On the other hand, moving the used and associated entries 25, 26 and 27 to the heads of their respective lists can speed subsequent uses, particularly if the application programs 10 operate on processor files 12 in a localized manner. In that case, the recently-used entries 25, 26 and 27 will be near the heads of their respective lists 22, 23, and 24, not randomly-distributed throughout the lists as may be the case if the cache manager 20 does not move entries to the heads of the lists when it uses them. If the recently-used entries are near the heads of the respective lists, the cache manager 20 will locate a recently-used entry in less time while stepping through the lists as described above in connection with FIGS. 4A-1 through 4A-6, than if recently used entries are randomly distributed through the lists.

Furthermore, in embodiments where one or more of the entries 25, 26 or 27 have the same size, a common unused entry list may be used for those types of entries which have the same size. These embodiments have the possible advantage that the cache will somewhat self-optimize for the type of information being accessed by the users at a particular time. For example, in an embodiment where the directory entries and file header entries use a common unused entry list, if many file headers are being manipulated, but few directories are being manipulated, a greater share of the cache memory will automatically be devoted to storing file headers. It may be useful to establish a quota mechanism (in addition to the directory/header and header/contents quotas described above) to prevent an excessive number of the same-sized entries from being used to store one type of information (e.g., to prevent all the same-sized entries from being used to store file headers). This second quota mechanism may be particularly useful where prefetching is employed (see the above discussion of the tradeoff between prefetching and the retaining of unused entries).

In another embodiment, the above result is achieved even though the entries have different sizes. This is done by dynamically configuring the amount of memory allocated to directory entries, file header entries, and file contents entries based on the level of use of the different types of entries. The re-allocation of space is performed by removing unused entries from one of the unused entry lists, and adding entries of a different size (but in the same physical memory locations) to another unused entry list. Typically, more directory entries will be required if the file system load is high, because many users will be using many different directories. Thus, in one embodiment the cache manager periodically determines the current system load, and allocates additional space to the directory entries when the load is high. In another embodiment, the cache manager tracks the length of the unused entry lists, and moves entries (in the manner described above) from those lists with relatively longer average size to those lists with relatively shorter average size.

LRU replacement algorithms may not be necessarily used for the file content entry list. For example, the file content entry cache may have a different replacement algorithm based on knowledge of the organization of a particular file.

What is claimed is:

1. A method for managing the use and re-use of entries of a cache, said entries containing data retrieved from a mass storage into said cache to be thereafter available for use by a computer system, comprising the computer system
    grouping entries;
    assigning each entry a priority for storage relative to other entries of the same group;
    identifying at least a first entry and a second entry belonging to different respective said groups which are related in a system of files in said mass storage; and
    selecting one of said entries of said cache for re-use according to the priority for storage assigned to said entry and the priority for storage assigned to identified related entries.

2. The method of claim 1 further comprising
    storing pointers in said cache linking said identified related entries.

3. The method of claim 2 wherein the step of assigning entries priority for storage comprises assigning each said entry a priority for storage relative to other entries within its group by the following steps:
    when the data contained in a first entry of a first group is used by said computer system, said first entry is assigned the highest priority for storage within the entries of said first group, and
    when a second entry, which is related by a pointer to said first entry, is assigned the highest priority for storage of a second group, said first entry is assigned the highest priority for storage within the entries of said first group.

4. The method of claim 3 wherein the step of selecting an entry for re-use comprises
   selecting one said group of entries that contain data of a type corresponding to the type of data to be stored in the re-used entry, and
   selecting the entry of the selected group which has the lowest priority for storage,
   whereby the selected entry has the lowest priority for storage of the selected group and all entries related to the selected entry have the lowest priority for storage of their respective groups.

5. The method of claim 3 further comprising
   removing from said cache entries which are not used by said computer system for a given duration of time.

6. The method of claim 2 wherein re-use of an entry results in re-use of a related entry.

7. The method of claim 2, further comprising prefetching data into said cache when data required by said computer system is retrieved from said mass storage, said prefetching comprising
   retrieving said required data into a first entry,
   placing said first entry into a first group,
   identifying a second entry in a second group which is related to said first entry,
   storing a pointer linking said first entry to said second entry,
   identifying other data in said mass storage which is related to the data contained in said second entry in a similar manner as said required data,
   retrieving said other data into one or more additional entries,
   placing said additional entries into said first group, and
   storing pointers linking said additional entries to said second entry.

8. The method of claim 7 further comprising
   limiting the number of additional entries which are prefetched into said cache upon retrieval of said required data.

9. The method of claim 2 further comprising
   limiting the number of entries in one group in said cache.

10. The method of claim 2 further comprising
    for each group, limiting the number of entries which are related to the same entry in another group.

11. A method for caching information retrieved by application programs from files organized in a file system in mass storage, comprising
    organizing a cache in at least two levels having multiple cache entries, including an upper level comprising directory entries storing directory file information and representing directories in said file system, and a lower level comprising file header entries storing file header information and representing files in said file system,
    identifying file header and directory entries related such that the identified directory entry represents the directory containing the file represented by the identified file header entry, and storing pointers in the cache linking the related entries,
    assigning each entry a priority for storage relative to the other entries in the same level, and
    managing use and re-use of said cache entries according to the priority for storage assigned to said entries.

12. The method of claim 11 wherein said cache includes a third lowest level comprising file contents entries storing file contents information and representing file contents in said file system, and further comprising
    identifying file contents and file header entries related such that the identified file header entry represents the file containing the file contents represented by the identified file contents entry, and storing pointers in the cache linking the related entries.

13. The method of claim 12, wherein each cache level may have been new entries added, further comprising
    adding new entries in a given level of said cache by the steps of
    searching for an unused entry in said given level, and
    where an unused entry is located, adding said unused entry to the entries of said given level, or
    where an unused entry is not located, replacing an entry of said given level.

14. The method of claim 13 further comprising
    when an entry is added to a given level, or when the information stored by an entry of a given level is used by an application program, said entry is indicated as the most-recently-used entry of said given level.

15. The method of claim 14 further comprising
    when said entry is indicated as the most-recently-used entry of said given level, an entry related to said entry is indicated as the most-recently-used entry of the related entry's level.

16. The method of claim 15 wherein replacing an entry from a given level comprises selecting the least-recently-used entry in said given level,
    whereby
    if the replacing entry is a directory entry, the replaced entry is the entry which contained the directory file of the least-recently-used directory,
    if the replacing entry is a file header entry, the replaced entry is the entry which contained the header of the least-recently-used file of the least-recently-used directory; or
    if the replacing entry is a file contents entry, the replaced entry is the entry which contained the least-recently-used file contents of the least-recently-used file of the least-recently-used directory.

17. The method of claim 16 wherein each said entry contains a replacement value used for selecting an entry for replacement.

18. The method of claim 17 wherein
    said replacement value is a time stamp, and
    when an entry is added or when the information stored in an entry is used by an application program, the replacement value of said entry is updated to a current time stamp value.

19. The method of claim 18 further comprising
    when an entry is added to a given level or when the information stored in an entry at a given level is used by an application program, updating the replacement value of a related entry of a higher level to a current time stamp value.

20. The method of claim 19 wherein
    replacing a selected entry from a given level comprises selecting the entry of said given level containing the least recent time stamp value, and
    if said replaced entry is the only entry of said given level which is related to a second entry in a higher level, replacement of said replaced entry entails removal of said second entry from said higher level.

21. The method of claim 16 wherein the entries of each said level are organized as a list, and when an entry is added to a given level or when the information stored in a given entry at a given level is used by an application program:

(1) said added or used entry is moved to an end of said given level's list, (2) an entry of a higher level which is related to said added or used entry is moved to an end of said higher level's list, and (3) one or more entries of a lower level which are related to said added or used entry are moved, as a group and maintaining the ordering within the group, to an end of said lower level's list.

22. The method of claim 2 further comprising when an entry is added to a given level or when the information stored in a given entry at a given level is used by an application program:

(4) one or more entries of said given level which are related to the entry of said higher level which was moved in step (2) are moved, as a group and maintaining the ordering within the group, to a position next to said added or used entry at said end of said given level's list, and (5) one or more groups of entries of said lower level which are related to the entry of said given level which was moved in step (4) are moved, as groups and maintaining the ordering within and between the groups, to positions next to the entries moved in step (3) at said end of said lower level's list.

23. The method of claim 21 wherein replacing a selected entry from a given level comprises selecting an entry of said given level's list which is at an end opposite said end.

24. The method of claim 12 further comprising in response to a request from an application program requiring that a directory entry be added to said cache, fetching said directory entry into said cache, and in connection with fetching said directory entry, prefetching into said cache file header entries storing headers of files from the directory represented by said directory entry, and in response to a request from an application program requiring that a file header entry be added to said cache, fetching said file header entry into said cache, and in connection with fetching said file header entry, prefetching into said cache file contents entries storing contents of the file represented by said file header entry.

25. The method of claim 13 further comprising upon a request from an application program to open a file, determining whether a file header entry storing the header of said file is stored in said cache, and if not adding such an entry.

26. The method of claim 12 further comprising establishing quotas which limit the number of file header entries which are related to one directory entry, and the number of file contents entries which are related to one file header entry, and managing the use and re-use of entries in said levels to enforce said quotas.

27. The method of claim 26 wherein said quotas are enforced in accordance with the following step:

when a quota will be exceeded by adding a new entry to a given level, an existing entry from said given level which is related to the same entry in a higher level as said new entry is replaced by said new entry.

28. The method of claim 27 wherein the entry replaced by said new entry is the least-recently-used of the entries of said given level which are related to the same entry in a higher level as said new entry.

29. The method of claim 28 wherein the entry replaced by said new entry is the least-recently-used of the entries of said given level, whereby if the replacing entry is a directory entry, the replaced entry is the entry which contained the directory file of the least-recently-used directory, if the replacing entry is a file header entry, the replaced entry is the entry which contained the header of the least-recently-used file of the least-recently-used directory; or if the replacing entry is a file contents entry, the replaced entry is the entry which contained the least-recently-used file contents of the least-recently-used file of the least-recently-used directory.

30. The method of claim 26 further comprising establishing further quotas limiting the total number of entries of each level.

31. The method of claim 30 wherein said quotas are enforced in accordance with the following step:

when a quota described in claim 30 will be exceeded by adding said new entry, an existing entry from said given level is replaced by said new entry.

32. The method of claim 31 wherein the entry replaced by said new entry is the least-recently-used of the entries of said given level, whereby if the replacing entry is a directory entry, the replaced entry is the entry which contained the directory file of the least-recently-used directory, if the replacing entry is a file header entry, the replaced entry is the entry which contained the header of the least-recently-used file of the least-recently-used directory; or if the replacing entry is a file contents entry, the replaced entry is the entry which contained the least-recently-used file contents of the least-recently-used file of the least-recently-used directory.

33. The method of claim 30 wherein said quotas are adjusted based on the frequency of use of the entries in said levels, whereby the storage space in said cache that is devoted to each level may be adjusted.

34. The method of claim 33 wherein said quotas are established such that the directory entry level is less likely to reach its quota than is another level.

35. The method of claim 34 further comprising said quotas are adjusted based on the number of available unused entries, whereby the storage space in said cache that is devoted to each level may be adjusted.

36. The method of claim 35 further comprising organizing unused entries into one or more levels corresponding to said higher, lower, and lowest levels, and wherein said quotas are adjusted by reallocating unused entries between said levels.

37. The method of claim 35 wherein adjustments to said quotas are enforced by removing entries from said cache and placing said entries in said unused entry levels.

38. The method of claim 11 further comprising in response to a request from an application program requiring that an entry be added to a given level of said cache, fetching said needed entry into said cache, and in connection with fetching said needed entry, prefetching an additional entry into said cache.

39. The method of claim 38 wherein said additional entry is at said given level.

40. The method of claim 38 wherein said additional entry is at a level different from said given level, and said additional entry is related to said needed entry.

41. The method of claim 38 wherein multiple entries are prefetched, the number of entries being limited by a prefetching quota.

42. The method of claim 41 wherein
said prefetching quota is adjusted based on the number of entries available in all levels.

43. The method of claim 41 further comprising
organizing unused entries into one or more levels corresponding to said higher, lower, and lowest levels, and
each said level has a prefetching quota, and wherein each level's prefetching quota is adjusted based on the number of entries available in said level.

44. The method of claim 38 wherein each said entry contains an old age indicator used for selecting entries for removal, and further comprising
setting the old age indicator of needed entries when placed in said cache,
clearing the old age indicator of prefetched entries when placed in said cache,
when an entry is used by an application program, setting the old age indicator of said entry, and
periodically removing from said cache all entries having cleared old age indicators, and then clearing the old age indicators of all entries which remain in the cache,
whereby prefetched entries which have not been used by an application program in time period after said request may be aged and removed from said cache.

45. The method of claim 11 further comprising
aging and removing from said cache entries which have not been used by an application program over a predetermined time period.

46. The method of claim 45 wherein each said entry contains a old age indicator, and said aging comprises
when an entry is used by an application program, setting the old age indicator of said entry, and
periodically removing from said cache all entries having cleared old age indicators, and then clearing the old age indicators of all entries which remain.

47. The method of claim 13 wherein
replacement or removal of an entry from a given level entails removing all entries or lower levels which are related to said entry.

48. The method of claim 47 wherein
if said replaced or removed entry is the only entry of said given level which is related to a second entry in a higher level, replacement or removal of said replaced or removed entry entails removal of said second entry from said higher level.

49. The method of claim 48 further comprising
retaining a file header entry in said cache as long as said file remains open, whether or not any file contents of said file are stored in said cache.

50. A method comprising storing in a cache information describing files and directories of files retrieved by application programs from a file system in which files are organized according to user-defined information relationships among said files and directories, storing in said cache contents of said files in response to a request to said file system from an application program, fetching needed information into a cache, and in connection with fetching said needed information, prefetching other information from said file system which is not immediately needed but is related to said needed information through said user-defined relationships among said files and directories.

51. The method of claim 50 wherein the amount of information prefetched is limited by a quota.

52. The method of claim 50 wherein said prefetching comprises prefetching headers of files.

53. The method of claim 50 wherein said needed information is a directory file and said prefetching comprises prefetching headers of files in the directory described by said directory file.

54. The method of claim 50 wherein said needed information is a file header and said prefetching comprises prefetching headers of files in the same directory as said needed file header.

55. The method of claim 54 wherein said prefetching comprises fetching the header of files having symbolic file names which match the symbolic file name of the file associated with the needed header.

56. The method of claim 55 wherein the nature of the similarity between said symbolic file names is determined by the type of application program making said request.

57. The method of claim 56 wherein said application program is a compiler, and said needed and prefetched files are source and object modules of a program being compiled.

58. A method of a managing a cache of information retrieved by application programs from a file system organized according to user-defined information relationships, said information including file contents as well as file headers describing files and directory files describing directories of files, comprising
establishing quotas that set a limit on the amount of information fetched from said mass storage into said cache, said quotas being applicable to the amount of file contents from a given file and the number of file headers from a given directory, and
regulating the fetching of information from mass storage into said cache based on said quotas.

59. The method of claim 58 wherein said quotes may be disabled during operation of specified application programs.

60. The method of claim 59 wherein said quotas are disabled during operation of a backup program.

61. A method for storing in a cache files retrieved from a file system in a computer system, comprising the computer system
storing in a cache, information describing files and directories of files retrieved by application programs from a file system,
storing in said cache, contents of said files
upon a request from an application program to open a file, determining whether an entry storing the header of said file is stored in said cache, and if not creating such an entry, and retaining said entry in said cache so long as said file remains open, whether or not any said contents of said file are stored in said cache.

62. The method of claim 11 further comprising establishing a quota which limits the number of file header entries in said lower level which are related to one directory entry in said upper level, and managing the use and re-use of entries in said lower level to enforce said quota.

* * * * *